US008188944B2

(12) United States Patent
Yamamoto et al.

(10) Patent No.: US 8,188,944 B2
(45) Date of Patent: May 29, 2012

(54) DISPLAY DEVICE, METHOD FOR DRIVING SAME, AND ELECTRONIC APPARATUS

(75) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 698 days.

(21) Appl. No.: 12/292,900

(22) Filed: Dec. 1, 2008

(65) Prior Publication Data

US 2009/0167652 A1 Jul. 2, 2009

(30) Foreign Application Priority Data

Dec. 26, 2007 (JP) ................................ 2007-333721

(51) Int. Cl.

| | |
|---|---|
| ***G09G 3/20*** | (2006.01) |
| ***G09G 5/00*** | (2006.01) |
| ***G09G 5/02*** | (2006.01) |
| ***G06F 3/038*** | (2006.01) |
| ***H01J 29/10*** | (2006.01) |

(52) U.S. Cl. .......... 345/76; 345/205; 345/204; 345/690; 313/463; 315/169.3

(58) Field of Classification Search .............. 345/76–83, 345/690, 211, 205; 315/169.3

See application file for complete search history.

(56) References Cited

U.S. PATENT DOCUMENTS

| | | | | |
|---|---|---|---|---|
| 2002/0135547 A1* | 9/2002 | Tanabe | ......................... | 345/75.2 |
| 2005/0067970 A1 | 3/2005 | Libsch et al. | | |
| 2005/0105031 A1 | 5/2005 | Shih et al. | | |
| 2007/0115224 A1* | 5/2007 | Yamamoto et al. | ............. | 345/76 |
| 2007/0115225 A1* | 5/2007 | Uchino et al. | .................. | 345/76 |

FOREIGN PATENT DOCUMENTS

| | | |
|---|---|---|
| EP | 1 785 979 | 5/2007 |
| EP | 1 860 637 | 11/2007 |
| JP | 2003-255856 A | 9/2003 |
| JP | 2003-271095 A | 9/2003 |
| JP | 2004-029791 A | 1/2004 |
| JP | 2004-093682 A | 3/2004 |
| JP | 2004-133240 A | 4/2004 |
| JP | 2005-206590 A | 8/2005 |

OTHER PUBLICATIONS

Singapore Search and Examination Report issued by the Austrian Patent Office Feb. 25, 2010 for corresponding Singapore Application No. 200809512-7.

European Search Report issued Apr. 28, 2009 for corresponding European Application No. 08 25 3899.

European Patent Communication Pursuant to Article 94(3)EPC issued Oct. 17, 2011 for corresponding European Application No. 08 253 899.2.

* cited by examiner

*Primary Examiner* — Bipin Shalwala
*Assistant Examiner* — Hang Lin
(74) *Attorney, Agent, or Firm* — Rader Fishman & Grauer, PLLC

(57) ABSTRACT

In an embodiment of the present invention, a signal driver employs a two-stage system in which the potential of a signal line (SL) is switched from a reference potential (Vofs) to an intermediate potential (Vofs2), and then switched to a signal potential (Vsig) of a video signal. A scanner supplies a first control pulse to a scan line (WS) when the signal line (SL) is at the intermediate potential (Vofs2), and then supplies a second control pulse to thereby turn on and off a sampling transistor T1 when the signal line (SL) is at the signal potential (Vsig). Based on this configuration, two times of mobility correction (μ correction) are carried out.

10 Claims, 23 Drawing Sheets

(1)

(2)

(3)

(5)

(5a)

(6)

(7)

DISPLAY DEVICE, METHOD FOR DRIVING SAME, AND ELECTRONIC APPARATUS

CROSS REFERENCES TO RELATED APPLICATIONS

The present invention contains subject matter related to Japanese Patent Application JP 2007-333721 filed in the Japan Patent Office on Dec. 26, 2007, the entire contents of which being incorporated herein by reference.

BACKGROUND OF THE INVENTION

1. Field of the Invention

The present invention relates to an active-matrix display device including light-emitting elements in its pixels, and a method for driving the same. Furthermore, the present invention relates to electronic apparatus including such a display device.

2. Description of the Related Art

In recent years, development of flat self-luminous display devices employing organic EL (Electro Luminescence) devices as light-emitting elements is being actively promoted. The organic EL device is based on a phenomenon that an organic thin film emits light in response to application of an electric field thereto. The organic EL device can be driven by application voltage of 10 V or lower, and thus has low power consumption. Furthermore, because the organic EL device is a self-luminous element that emits light by itself, it does not need an illuminating unit and thus easily allows reduction in the weight and thickness of a display device. Moreover, the response speed of the organic EL device is as very high as about several microseconds, which causes no image lag in displaying of a moving image.

Among the flat self-luminous display devices employing the organic EL devices for the pixels, particularly an active-matrix display device in which thin film transistors are integrally formed as drive elements in the respective pixels is being actively developed. Active-matrix flat self-luminous display devices are disclosed in e.g. Japanese Patent Laid-Open Nos. 2003-255856, 2003-271095, 2004-133240, 2004-029791, and 2004-093682.

FIG. 28 is a schematic circuit diagram showing one example of an active-matrix display device of a related art. This display device includes a pixel array part 1 and a peripheral drive part. The drive part includes a signal driver 3 and a write scanner 4. The pixel array part 1 includes signal lines SL disposed along the columns and scan lines WS disposed along the rows. Pixels 2 are disposed at the respective intersections of the signal lines SL and the scan lines WS. FIG. 28 shows merely one pixel 2 for easy understanding. The write scanner 4 includes shift registers. The shift registers operate in response to a clock signal ck supplied from the external and sequentially transfer a start pulse sp supplied from the external similarly, to thereby output a control signal to the scan lines WS sequentially. The signal driver 3 supplies a video signal to the signal lines SL in matching with the line-sequential scanning by the write scanner 4.

The pixel 2 includes a sampling transistor T1, a drive transistor T2, a hold capacitor C1, and a light-emitting element EL. The drive transistor T2 is a P-channel transistor. The source thereof as one current terminal thereof is connected to a power supply line and the drain thereof as the other current terminal thereof is connected to the light-emitting element EL. The gate of the drive transistor T2 as the control terminal thereof is connected to the signal line SL via the sampling transistor T1. The sampling transistor T1 is turned on in response to the control signal supplied from the write scanner 4 to thereby sample the video signal supplied from the signal line SL and write it to the hold capacitor C1. The drive transistor T2 receives, at its gate, the video signal written to the hold capacitor C1 as a gate voltage Vgs, and causes a drain current Ids to flow to the light-emitting element EL. This causes the light-emitting element EL to emit light with the luminance dependent upon the video signal. The gate voltage Vgs refers to the potential of the gate relative to that of the source.

The drive transistor T2 operates in the saturation region, and the relationship between the gate voltage Vgs and the drain current Ids is represented by the following characteristic equation.

$$Ids=(1/2)\mu(W/L)Cox(Vgs-Vth)^2$$

In this equation, μ denotes the mobility of the drive transistor, W denotes the channel width of the drive transistor, L denotes the channel length of the drive transistor, Cox denotes the capacitance of the gate insulating film of the drive transistor per unit area, and Vth denotes the threshold voltage of the drive transistor. As is apparent from this characteristic equation, the drive transistor T2 functions as a constant current source that supplies the drain current Ids depending on the gate voltage Vgs when it operates in the saturation region.

FIG. 29 is a graph showing the voltage-current characteristic of the light-emitting element EL. In this graph, an anode voltage V is plotted on the abscissa and the drive current Ids is plotted on the ordinate. The anode voltage of the light-emitting element EL is equivalent to the drain voltage of the drive transistor T2. The light-emitting element EL has a tendency that its current-voltage characteristic changes over time and the characteristic curve gradually falls down along with time elapse. Therefore, the anode voltage (drain voltage) V changes even if the drive current Ids is constant. However, in the pixel circuit 2 shown in FIG. 28, the drive transistor T2 operates in the saturation region and allows the flowing of the drive current Ids dependent upon the gate voltage Vgs irrespective of change in the drain voltage. This makes it possible to keep the light-emission luminance constant irrespective of aging change in the characteristic of the light-emitting element EL.

FIG. 30 is a circuit diagram showing another example of a related-art pixel circuit. This pixel circuit is different from the pixel circuit shown in FIG. 28 in that the drive transistor T2 is not a P-channel transistor but an N-channel transistor. In many cases, it is more advantageous that all of the transistors included in the pixel are N-channel transistors in terms of the circuit manufacturing process.

However, in the circuit configuration of FIG. 30, because the drive transistor T2 is an N-channel transistor, the drain thereof is connected to the power supply line and a source S thereof is connected to the anode of the light-emitting element EL. Therefore, if the characteristic of the light-emitting element EL changes over time, the potential of the source S is affected and thus Vgs changes, which leads to aging change in the drain current Ids supplied from the drive transistor T2. Thus, the luminance of the light-emitting element EL changes over time. Not merely the characteristic of the light-emitting element EL but also the threshold voltage Vth of the drive transistor T2 involves variation from pixel to pixel. Because the parameter Vth is included in the above-described transistor characteristic equation, Ids changes even if Vgs is constant. This results in variation in the light-emission luminance from pixel to pixel, which precludes achievement of the screen uniformity. As a related art, there has been proposed a display device having a function for correction against the variation in the threshold voltage Vth of the drive transistor T2 from pixel to pixel (threshold voltage correction function). This display device is disclosed in e.g. the above-mentioned Japanese Patent Laid-Open No. 2004-133240.

Besides the threshold voltage Vth, the mobility μ of the drive transistor T2 also involves variation from pixel to pixel. Because the parameter μ is included in the above-described transistor characteristic equation, Ids changes even if Vgs is constant. This results in variation in the light-emission luminance from pixel to pixel, which precludes achievement of the screen uniformity. As a related art, there has also been proposed a display device having a function for correction against the variation in the mobility μ of the drive transistor T2 from pixel to pixel (mobility correction function).

In the mobility correction, the optimum correction amount and correction time differ depending on the level of the video signal to be written to the pixel (luminance). It is difficult for the display device having the related-art mobility correction function to achieve the optimum mobility correction amount dependent upon the luminance, which is a problem that should be solved. Furthermore, it is difficult for the related-art mobility correction function to achieve the accurate and proper correction amount due to the influence of fluctuation in the potential of the signal line, which is a problem that should be solved.

SUMMARY OF THE INVENTION

There is a need for the embodiment of the invention to improve a mobility correction function to thereby achieve the optimum correction amount dependent upon the luminance, and provide a highly-accurate mobility correction function free from the influence of fluctuation in the potential of a signal line. According to a mode of the present invention, there is provided a display device including a pixel array part configured to include scan lines disposed along rows, signal lines disposed along columns, and pixels that are disposed at the intersections of the scan lines and the signal lines and arranged in a matrix, and a drive part configured to drive the pixels via the scan lines and the signal lines. The pixel includes at least a sampling transistor, a drive transistor, a hold capacitor, and a light-emitting element. The control terminal of the sampling transistor is connected to the scan line, and a pair of current terminals of the sampling transistor are connected between the signal line and the control terminal of the drive transistor. A current terminal of the drive transistor is connected to the light-emitting element. The hold capacitor is connected between the control terminal of the drive transistor and the current terminal of the drive transistor. The drive part has a scanner that sequentially supplies a control signal to the scan lines and a driver that supplies a video signal to the signal lines. In the pixel, the sampling transistor is turned on in response to the control signal to thereby sample the video signal and write the video signal to the hold capacitor, and a current that flows through the drive transistor at the time of the writing of the video signal is subjected to negative feedback to the hold capacitor from the current terminal of the drive transistor to thereby carry out correction for the mobility of the drive transistor. A drive current is supplied from the drive transistor to the light-emitting element depending on a video signal resulting from the correction after the correction. The driver switches the potential of the signal line from a reference potential to an intermediate potential before switching the potential of the signal line to a signal potential of the video signal, for the writing of the video signal to the hold capacitor. The scanner supplies a first control signal pulse to thereby turn on and off the sampling transistor when the signal line is at the intermediate potential, and then supplies a second control signal pulse to thereby turn on and off the sampling transistor when the signal line is at the signal potential.

According to the mode of the present invention, the signal driver carries out mobility correction by switching the potential of the signal line from the reference potential to the intermediate potential and then switching the potential to the signal potential. Employing such a two-stage system makes it possible to ensure the optimum mobility correction amount dependent upon the signal potential. The optimization of the mobility correction amount allows achievement of uniform image quality free from streaks and unevenness.

On the other hand, the scanner supplies the first control signal pulse to thereby turn on and off the sampling transistor when the signal line is at the intermediate potential, and then supplies the second control signal pulse to thereby turn on and off the sampling transistor when the signal line is at the signal potential. By turning on and off the sampling transistor twice in matching with the two-stage system in this way, the highly-accurate mobility correction amount free from the influence of fluctuation in the potential of the signal line can be ensured. This allows achievement of uniform image quality free from unevenness such as shading.

DETAILED DESCRIPTION OF THE PREFERRED EMBODIMENTS

Figure 1:
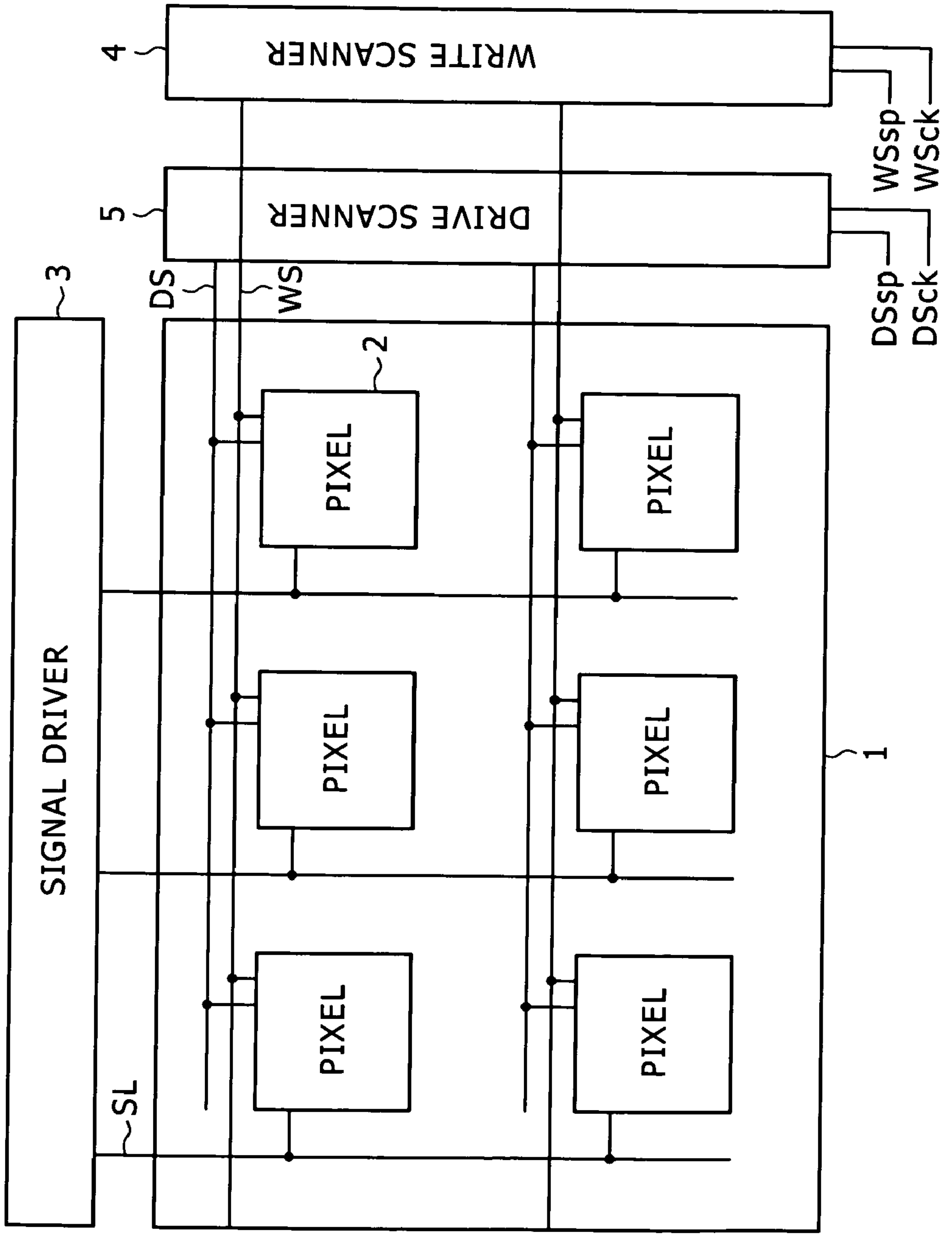
FIG. 1 is a block diagram showing the entire configuration of a display device according to an embodiment of the present invention.

Embodiments of the present invention will be described in detail below with reference to the drawings. FIG. 1 is a block diagram showing the entire configuration of a display device according to an embodiment of the present invention. As shown in FIG. 1, this display device includes a pixel array part 1 and a drive part (3, 4, 5) for driving the pixel array part 1. The pixel array part 1 includes scan lines WS along the rows, signal lines SL along the columns, pixels 2 disposed at the intersections of both the lines so as to be arranged in a matrix, and power feed lines DS as power supply lines disposed corresponding to the respective rows of the pixels 2. The drive part (3, 4, 5) includes a control scanner (write scanner) 4, a power supply scanner (drive scanner) 5, and a signal driver 3. The write scanner 4 sequentially supplies a control signal to the respective scan lines WS to thereby line-sequentially scan the pixels 2 on a row-by-row basis. The drive scanner 5 provides a supply voltage that is switched between a first potential and a second potential to the respective power feed lines DS in matching with the line-sequential scanning. The signal driver 3 supplies, to the signal lines SL along the columns, a signal potential as a video signal, a reference potential, and an intermediate potential in matching with the line-sequential scanning. The write scanner 4 operates in response to a clock signal WSck supplied from the external and sequentially transfers a start pulse WSsp supplied from the external similarly, to thereby output the control signal to the respective scan lines WS. The drive scanner 5 operates in response to a clock signal DSck supplied from the external and sequentially transfers a start pulse DSsp supplied from the external similarly, to thereby line-sequentially switch the potentials of the power feed lines DS.

Figure 2:
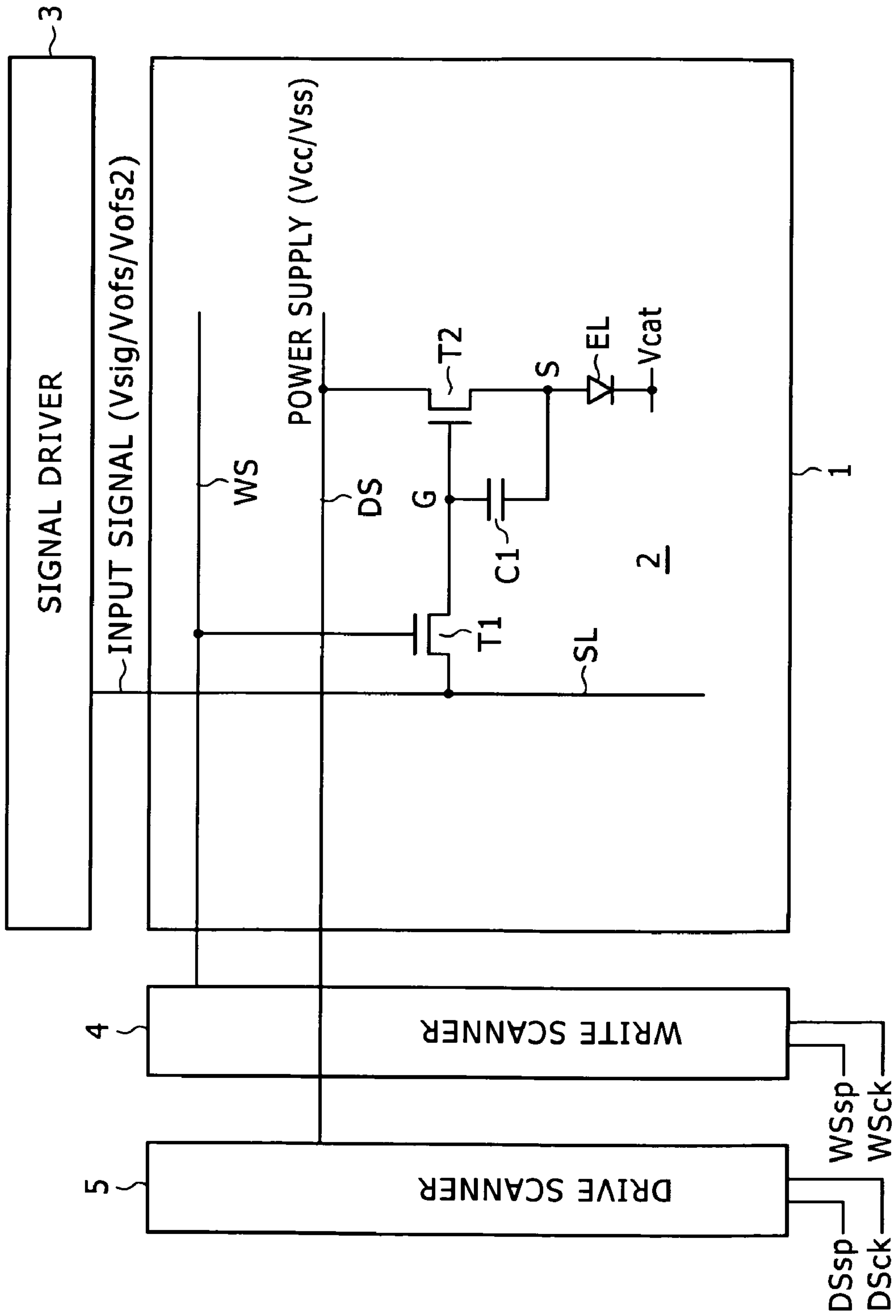
FIG. 2 is a circuit diagram showing one example of a pixel disposed in the display device shown in FIG. 1.

FIG. 2 is a circuit diagram showing the specific configuration of the pixel 2 included in the display device shown in FIG. 1. As shown in FIG. 2, the pixel circuit 2 includes a light-emitting element EL that is a two-terminal element (diode-type element) typified by e.g. an organic EL device, an N-channel sampling transistor T1, an N-channel drive transistor T2, and a hold capacitor C1 as a thin film element. The gate of the sampling transistor T1 as the control terminal thereof is connected to the scan line WS. One of the source and drain of the sampling transistor T1 as a pair of current terminals thereof is connected to the signal line SL, and the other is connected to the gate G of the drive transistor T2. One of the source and drain of the drive transistor T2 is connected to the light-emitting element EL, and the other is connected to the power feed line DS. In the present embodiment, the drive transistor T2 is an N-channel transistor. The drain side thereof as one current terminal thereof is connected to the power feed line DS, and the source side thereof as the other current terminal thereof is connected to the anode side of the light-emitting element EL. The cathode of the light-emitting element EL is fixed at a predetermined cathode potential Vcat. The hold capacitor C1 is connected between the source S of the drive transistor T2 as one current terminal thereof and the gate G thereof as the control terminal thereof. The control scanner (write scanner) 4 sequentially outputs the control signal to the pixels 2 having this configuration by switching the potentials of the scan lines WS between the lower potential and the higher potential, to thereby line-sequentially scan the pixels 2 on a row-by-row basis. The power supply scanner (drive scanner) 5 supplies the supply voltage that is switched between a first potential Vcc and a second potential Vss to the respective power feed lines DS in matching with the line-sequential scanning. The signal driver 3 supplies, to the signal lines SL along the columns, a signal potential Vsig serving as the video signal, a reference potential Vofs, and an intermediate potential Vofs2 between the signal potential Vsig and the reference potential Vofs in matching with the line-sequential scanning.

In this configuration, the sampling transistor T1 is turned on at the rising timing of the control signal to thereby sample the signal potential Vsig and write it to the hold capacitor C1 during a sampling period until the timing when the control signal falls down and the sampling transistor T1 is turned off. Simultaneously with the sampling, the current flowing through the drive transistor T2 is subjected to negative feedback to the hold capacitor C1 to thereby carry out correction relating to the mobility μ of the drive transistor T2 for the signal potential written to the hold capacitor C1. That is, the sampling period severs also as a mobility correction period during which the current flowing through the drive transistor T2 is subjected to the negative feedback to the hold capacitor C1.

The pixel circuit shown in FIG. 2 has a threshold voltage correction function in addition to the above-described mobility correction function. Specifically, the power supply scanner (drive scanner) 5 switches the potential of the power feed line DS from the first potential Vcc to the second potential Vss at a first timing before the sampling of the signal potential Vsig by the sampling transistor T1. The control scanner (write scanner) 4 turns on the sampling transistor T1 at a second timing before the sampling of the signal potential Vsig by the sampling transistor Tr1, to thereby apply the reference potential Vofs from the signal line SL to the gate G of the drive transistor T2 and set the source S of the drive transistor T2 to the second potential Vss. The power supply scanner (drive scanner) 5 switches the potential of the power feed line DS from the second potential Vss to the first potential Vcc at a third timing after the second timing, to thereby hold the voltage equivalent to the threshold voltage Vth of the drive transistor T2 in the hold capacitor C1. This threshold voltage correction function allows the display device to cancel the influence of variation in the threshold voltage Vth of the drive transistor T2 from pixel to pixel. Either the first timing or the second timing may be earlier than the other.

The pixel circuit 2 shown in FIG. 2 is also provided with a bootstrap function. Specifically, at the timing when the signal potential Vsig has been held in the hold capacitor C1, the write scanner 4 turns off the sampling transistor T1 to thereby electrically isolate the gate G of the drive transistor T2 from the signal line SL. This allows change in the gate potential of the drive transistor T2 to be linked to change in the source potential of the drive transistor T2 and thus allows the voltage Vgs between the gate G and the source S to be kept constant. Therefore, even when the current-voltage characteristic of the light-emitting element EL changes over time, the gate voltage Vgs can be kept constant and thus no change occurs in the luminance.

Figure 3:
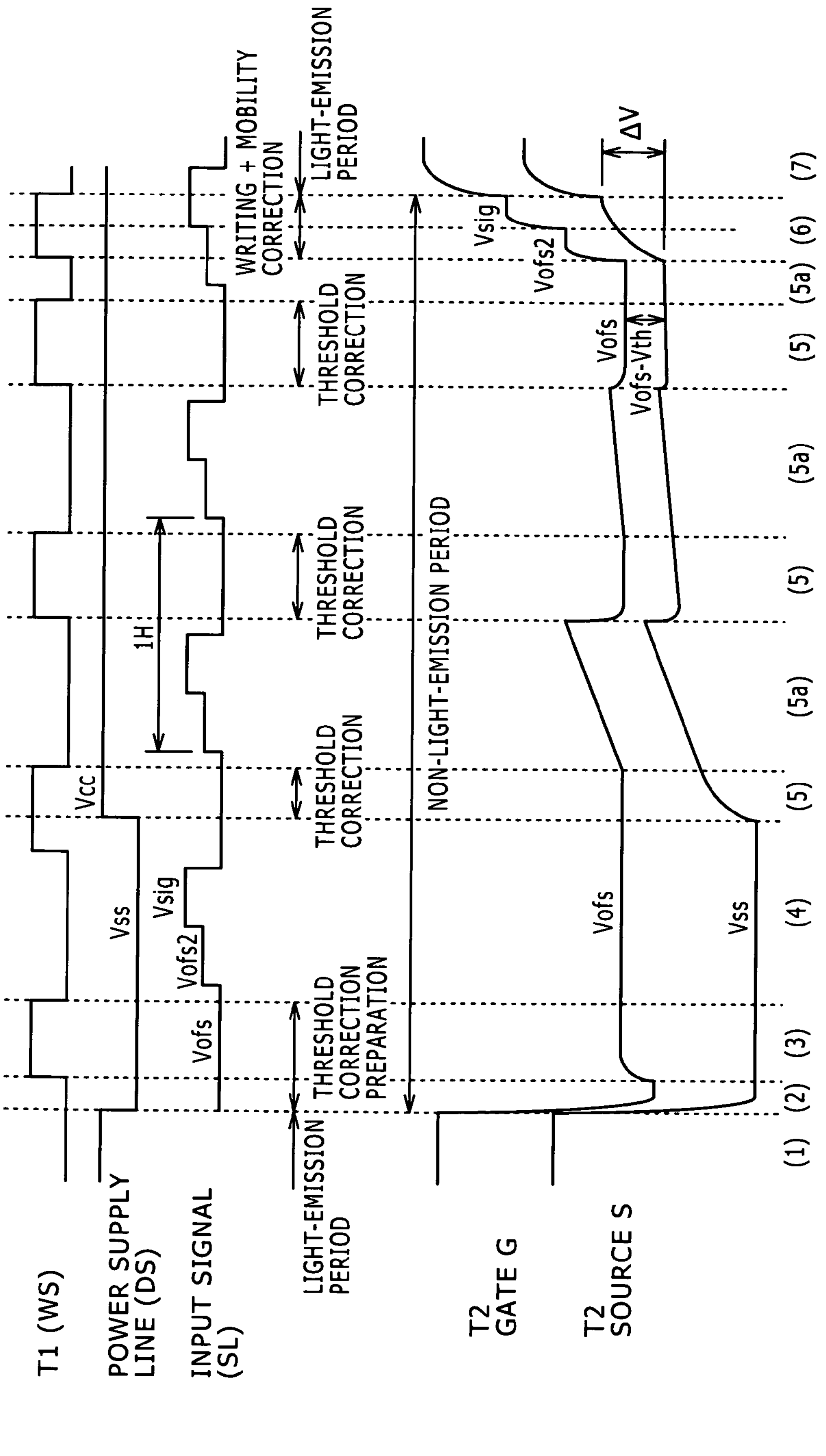
FIG. 3 is a timing chart showing a reference example of the operation of the pixel shown in FIG. 2.

FIG. 3 is a timing chart for explaining the operation of the pixel shown in FIG. 2. This timing chart is a reference example and relates to a previously-developed technique as the basis of the embodiments of the present invention. In this timing chart, potential changes of the scan line WS, the power feed line (power supply line) DS, and the signal line SL are shown along the same time axis. The potential change of the scan line WS corresponds to the control signal and controls the opening/closing of the sampling transistor T1. The potential change of the power feed line DS corresponds to the switching of the supply voltage between Vcc and Vss. The potential change of the signal line SL corresponds to the switching of the input signal among the signal potential Vsig, the reference potential Vofs, and the intermediate potential Vofs2. Furthermore, in parallel to these potential changes, potential changes of the gate G and the source S of the drive transistor T2 are also shown. The potential difference between the gate G and the source S is equivalent to Vgs as described above.

In this timing chart, the operation period is divided into periods (1) to (7) corresponding to the transition of the pixel operation for convenience. In the period (1) immediately before the start of the description-subject field, the light-emitting element EL is in the light-emission state. Thereafter, a new field of the line-sequential scanning starts. For the first period (2) of the new field, the potential of the power feed line DS is switched from the first potential Vcc to the second potential Vss. Subsequently, at the start of the next period (3), the potential of the input signal has been switched from Vsig to Vofs and the sampling transistor T1 is turned on. In the periods (2) and (3), the gate potential and the source potential of the drive transistor T2 are initialized. The periods (2) and (3) are equivalent to a preparatory period for the threshold voltage correction. In this preparatory period, the gate G of the drive transistor T2 is initialized to Vofs and the source S thereof is initialized to Vss. Subsequently, the threshold voltage correction operation is carried out in the threshold correction period (5), so that the voltage equivalent to the threshold voltage Vth is held between the gate G and the source S of the drive transistor T2. Specifically, the voltage equivalent to Vth is written to the hold capacitor C1 connected between the gate G and the source S of the drive transistor T2.

In the reference example shown in FIG. 3, the threshold correction period (5) is divided into three periods and the threshold voltage correction operation is carried out in a time-division manner. A waiting period (5*a*) is provided between the threshold voltage correction periods (5). The voltage equivalent to Vth is written to the hold capacitor C1 by dividing the threshold voltage correction period (5) and repeating the threshold voltage correction operation plural times in this manner. However, the embodiment of the present invention is not limited thereto, but it is also possible to carry out the correction operation in one threshold voltage correction period (5).

Thereafter, the writing operation period/mobility correction period (6) starts. In this period, the signal potential Vsig of the video signal is written to the hold capacitor C1 in such a manner as to be added to Vth, and the voltage ΔV for the mobility correction is subtracted from the voltage held in the hold capacitor C1. In this writing period/mobility correction period (6), the sampling transistor T1 should be kept at the conductive state in the time zone during which the signal line SL is at the intermediate potential Vofs2 and the signal potential Vsig. Thereafter, the light-emission period (7) starts, so that the light-emitting element emits light with the luminance dependent upon the signal potential Vsig. In this light emission, the light-emission luminance of the light-emitting element EL is not affected by variations in the threshold voltage Vth and the mobility μ of the drive transistor T2 because the signal potential Vsig has been adjusted with the voltage equivalent to the threshold voltage Vth and the voltage ΔV for the mobility correction. At the initial stage of the light-emission period (7), bootstrap operation is carried out and thereby the gate potential and the source potential of the drive transistor T2 rise up, with the voltage Vgs between the gate G and the source S of the drive transistor T2 kept constant.

Figure 4:
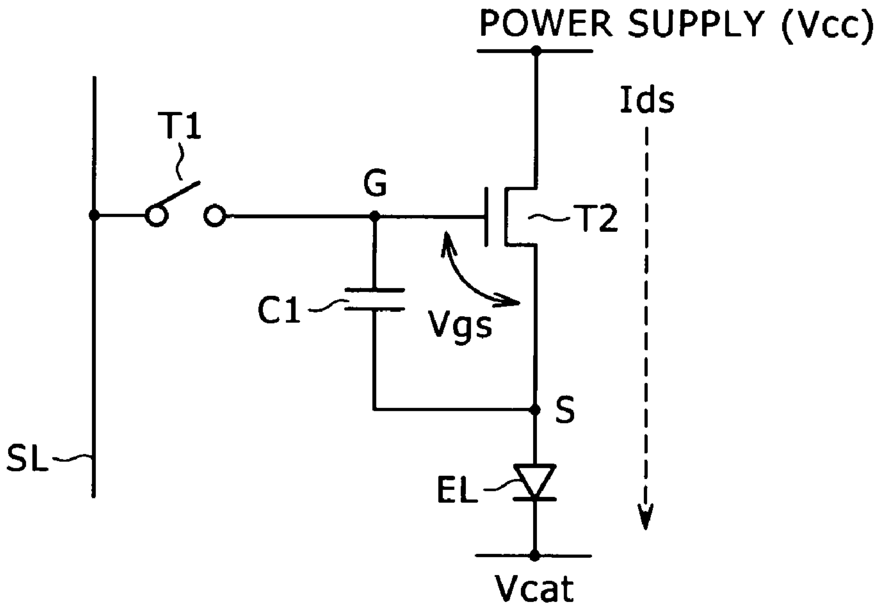
FIG. 4 is a schematic diagram for explaining the operation of the pixel shown in FIG. 2.

With reference to FIGS. 4 to 12, the operation of the pixel circuit shown in FIG. 2 will be described in detail below. Referring initially to FIG. 4, in the light-emission period (1), the supply potential is set to Vcc and the sampling transistor T1 is kept at the off-state. At this time, the drive current Ids flowing to the light-emitting element EL has the value represented by the above-described transistor characteristic equation depending on the voltage Vgs applied between the gate G and the source S of the drive transistor T2 because the drive transistor T2 is so set as to operate in the saturation region.

Figure 5:
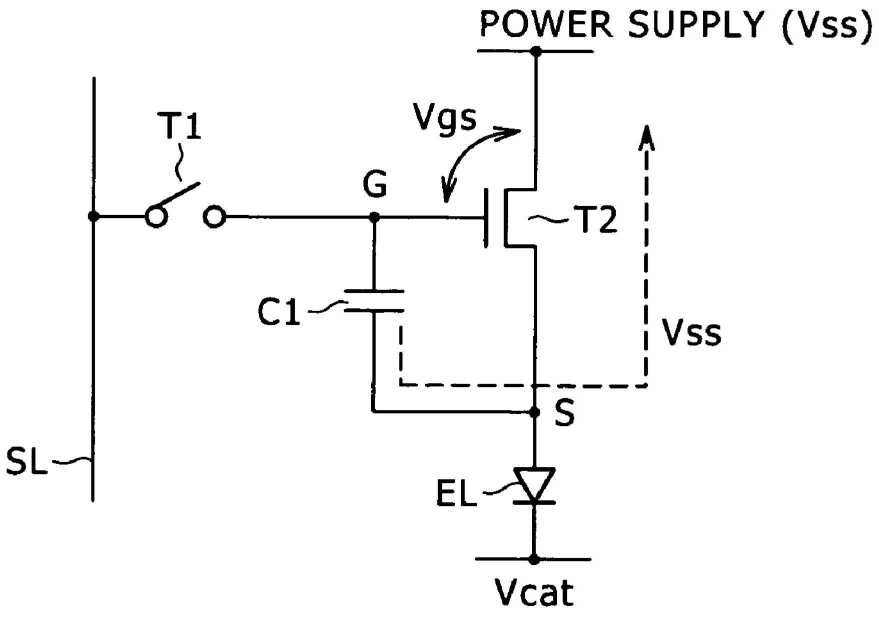
FIG. 5 is a schematic diagram for explaining the operation of the pixel shown in FIG. 2.

Referring next to FIG. 5, at the start of the preparatory period (2), the potential of the power feed line (power supply line) is set to Vss. Vss is so designed as to be lower than the sum of the threshold voltage Vthel and the cathode voltage Vcat of the light-emitting element EL. That is, the relationship Vss □ Vthel+Vcat is satisfied. Therefore, the light-emitting element EL stops the light emission and the power supply line side becomes the source of the drive transistor T2. At this time, the anode of the light-emitting element EL is charged to Vss.

Figure 6:
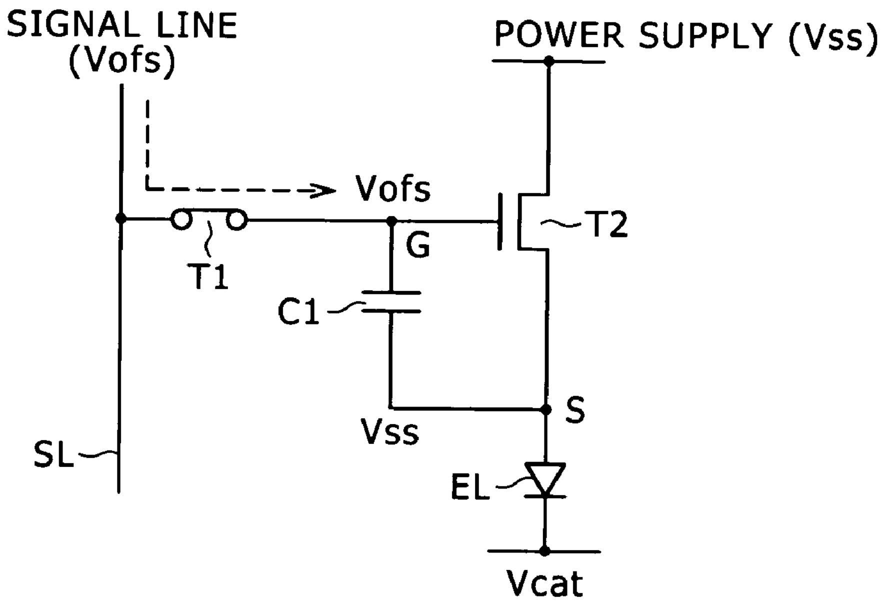
FIG. 6 is a schematic diagram for explaining the operation of the pixel shown in FIG. 2.

Referring next to FIG. 6, in the next preparatory period (3), the potential of the signal line SL is set to Vofs and the sampling transistor T1 is turned on, so that the gate potential of the drive transistor T2 is set to Vofs. In this way, the potentials of the source S and the gate G of the drive transistor T2 are initialized from those at the time of the light emission, so that the gate-source voltage Vgs becomes Vofs−Vss. This Vgs (=Vofs−Vss) is so designed as to be higher than the threshold voltage Vth of the drive transistor T2. By thus initializing the drive transistor T2 so that the relationship Vgs □ Vth may be satisfied, the preparation for the threshold voltage correction operation in the next period is completed.

Figure 7:
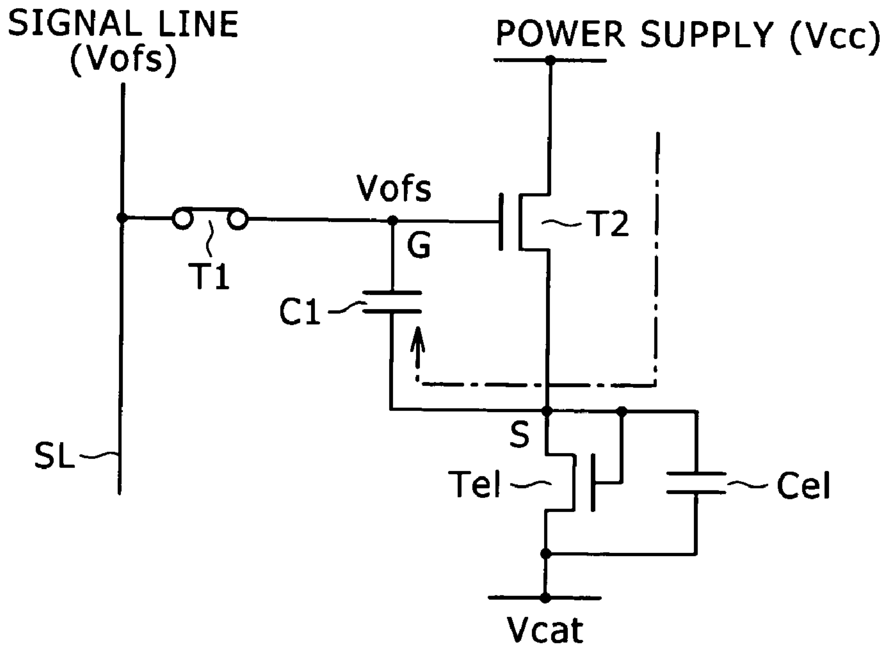
FIG. 7 is a schematic diagram for explaining the operation of the pixel shown in FIG. 2.

Referring next to FIG. 7, at the start of the threshold voltage correction period (5), the potential of the power feed line DS (power supply line) is returned to Vcc and the sampling transistor T1 is turned on again. Switching the supply voltage to Vcc causes the anode side of the light-emitting element EL to become the source S of the drive transistor T2, so that a current flows as shown in FIG. 7. At this time, the equivalent circuit of the light-emitting element EL is represented by a diode Tel and a capacitor Cel connected in parallel to each other. Because the anode potential (i.e. the source potential Vss) is lower than Vcat+Vthel, the diode Tel is in the off-state, and therefore the leakage current flowing therethrough is considerably smaller than the current flowing through the drive transistor T2. Therefore, most of the current flowing through the drive transistor T2 is used to charge the hold capacitor C1 and the equivalent capacitor Cel.

Figure 8:
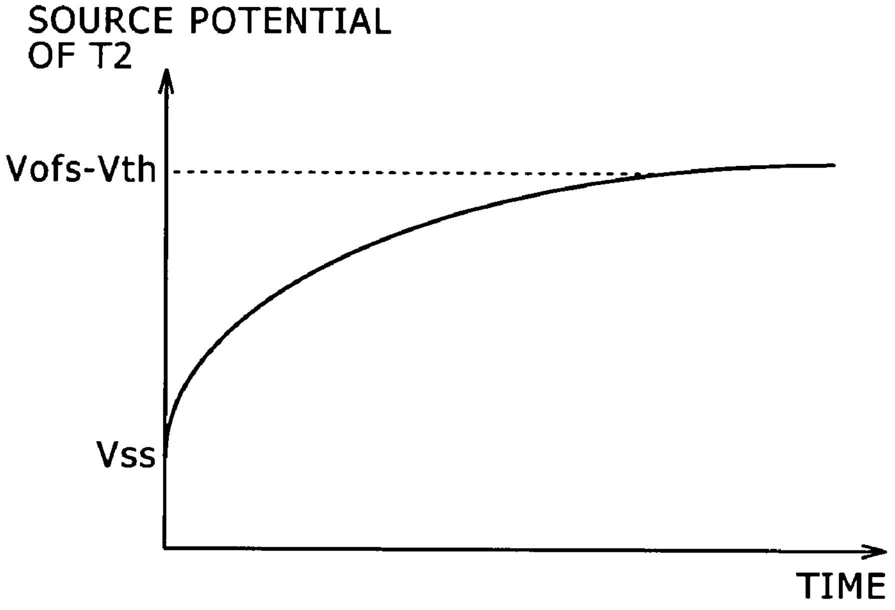
FIG. 8 is a graph for explaining the operation of the pixel shown in FIG. 2.

FIG. 8 shows temporal change in the source potential of the drive transistor T2 in the threshold voltage correction period (5) shown in FIG. 7. As shown in FIG. 8, the source potential of the drive transistor T2 (i.e. the anode voltage of the light-emitting element EL) increases from Vss along with time elapse. After the elapse of the threshold voltage correction period (5), the drive transistor T2 is cut off and the voltage Vgs between the source S and the gate G of the drive transistor T2 becomes Vth. The source potential at this time is Vofs−Vth. If this value Vofs−Vth is still lower than Vcat+Vthel, the light-emitting element EL is in the cut-off state.

Figure 9:
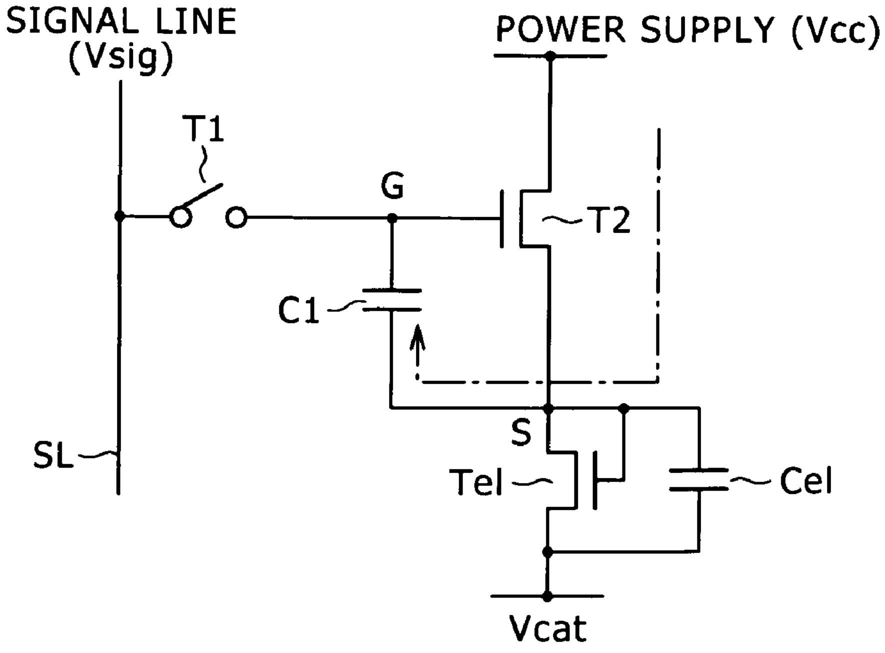
FIG. 9 is a schematic diagram for explaining the operation of the pixel shown in FIG. 2.

As shown in the graph of FIG. 8, the source potential of the drive transistor T2 increases along with time elapse. However, in the present example, the first threshold voltage correction period (5) is ended before the source potential of the drive transistor T2 reaches Vofs−Vth, and thus the waiting period (5*a*) starts in response to the turning-off of the sampling transistor T1. FIG. 9 shows the state of the pixel circuit in this waiting period (5*a*). In this first waiting period (5*a*), the voltage Vgs between the gate G and the source S of the drive transistor T2 is still higher than Vth, and therefore a current flows from the power supply Vcc via the drive transistor T2 to the hold capacitor C1 as shown in FIG. 9. Due to this current flowing, the source potential of the drive transistor T2 increases. In addition, the potential of the gate G also increases in linkage with the potential increase of the source S because the sampling transistor T1 is in the off-state and therefore the gate G is in the high-impedance state. That is, in the first waiting period (5*a*), both the source potential and the gate potential of the drive transistor T2 increase based on bootstrap operation. At this time, the light-emitting element EL will not emit light because reverse bias is applied to the light-emitting element EL continuously.

Thereafter, when the potential of the signal line SL is switched to Vofs again after the elapse of 1H, the sampling transistor T1 is turned on to start the second threshold voltage correction operation. When the second threshold voltage correction period (5) is ended, the second waiting period (5*a*) starts. By repeating the threshold voltage correction period (5) and the waiting period (5*a*) in this manner, the voltage between the gate G and the source S of the drive transistor T2 reaches the voltage equivalent to Vth finally. The source potential of the drive transistor T2 at this time is Vofs−Vth, which is lower than Vcat+Vthel.

Figure 10:
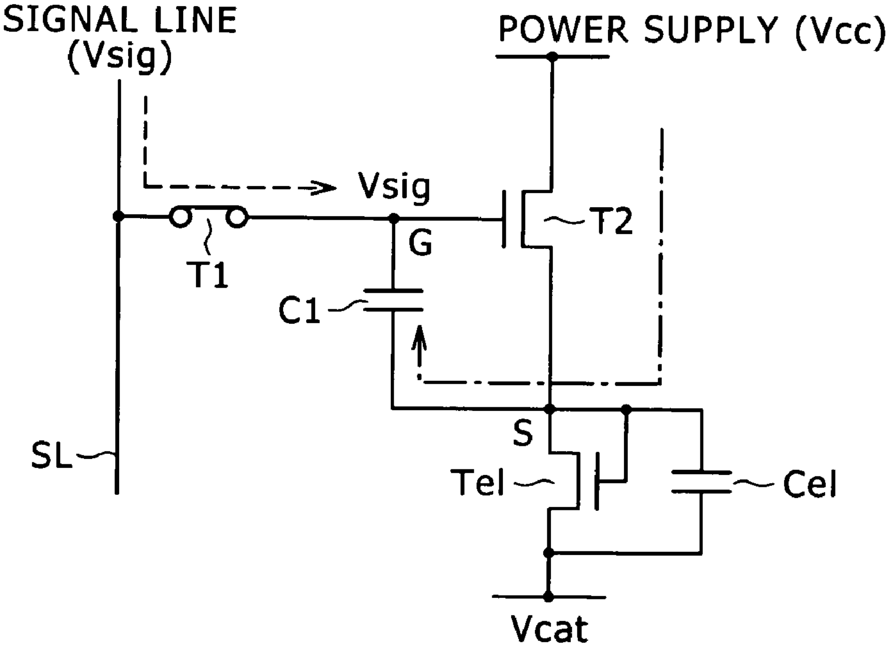
FIG. 10 is a schematic diagram for explaining the operation of the pixel shown in FIG. 2.

Referring next to FIG. 10, at the start of the signal writing period/mobility correction period (6), the potential of the signal line SL is switched in two stages from Vofs via Vofs2 to Vsig. The signal potential Vsig corresponds to the grayscale. The gate potential of the drive transistor T2 becomes Vsig because the sampling transistor T1 is turned on. On the other hand, the source potential increases along with time elapse because a current flows from the power supply Vcc. Also at this time, the current flowing from the drive transistor T2 is used exclusively for charging of the equivalent capacitor Cel and the hold capacitor C1 if the source potential of the drive transistor T2 does not surpass the sum of the threshold voltage Vthel and the cathode voltage Vcat of the light-emitting element EL. At this time, the current flowing from the drive transistor T2 reflects the mobility μ because the threshold voltage correction operation for the drive transistor T2 has been already completed. Specifically, if the drive transistor T2 has higher mobility μ, the current amount thereof at this time is larger and the increase amount ΔV of the source potential is also larger. In contrast, if the mobility μ is lower, the current amount of the drive transistor T2 is smaller and thus the increase amount ΔV of the source potential is smaller. Due to this operation, the gate voltage Vgs of the drive transistor T2 is so decreased as to reflect the mobility μ, i.e. decreased by ΔV. Thus, Vgs resulting from the complete correction of the mobility μ is obtained at the time of the completion of the mobility correction period (6).

Figure 11:
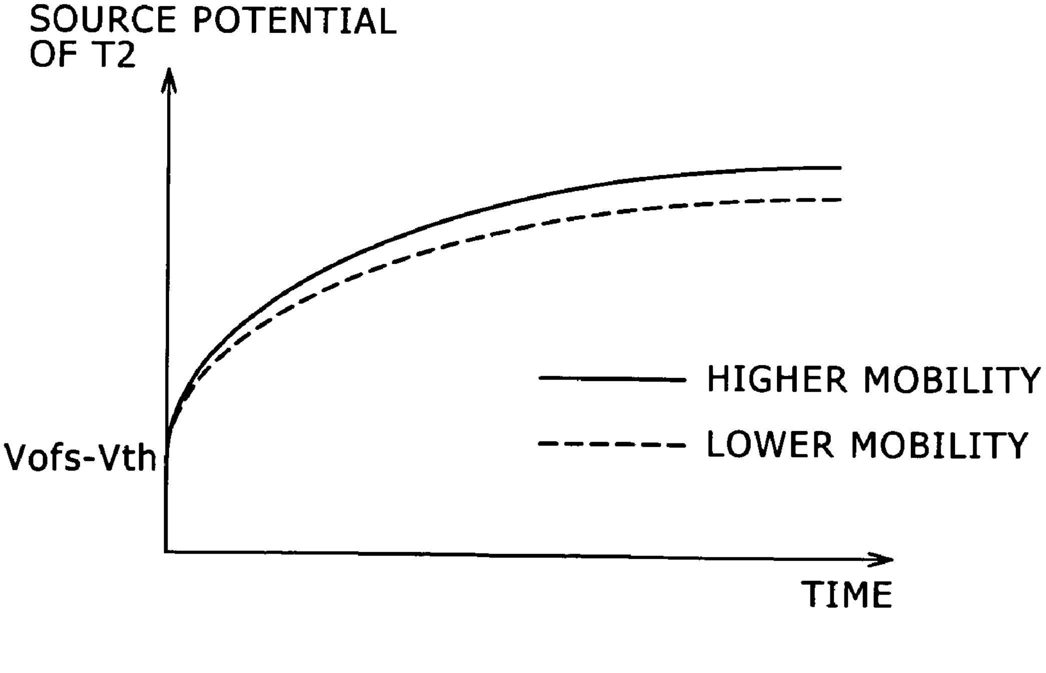
FIG. 11 is a graph for explaining the operation of the pixel shown in FIG. 2.

FIG. 11 is a graph showing temporal changes in the source potential of the drive transistor T2 in the above-described mobility correction period (6). As shown in FIG. 11, if the mobility of the drive transistor T2 is higher, the source potential increases faster and Vgs is correspondingly decreased. Specifically, if the mobility μ is higher, Vgs is so decreased as to cancel the influence of the higher mobility, and thus the drive current can be suppressed. On the other hand, if the mobility μ is lower, the source potential of the drive transistor T2 does not increase so fast and therefore Vgs is also not affected strongly. Therefore, if the mobility μ is lower, Vgs of the drive transistor is not greatly decreased so that the low drive capability may be covered.

Figure 12:
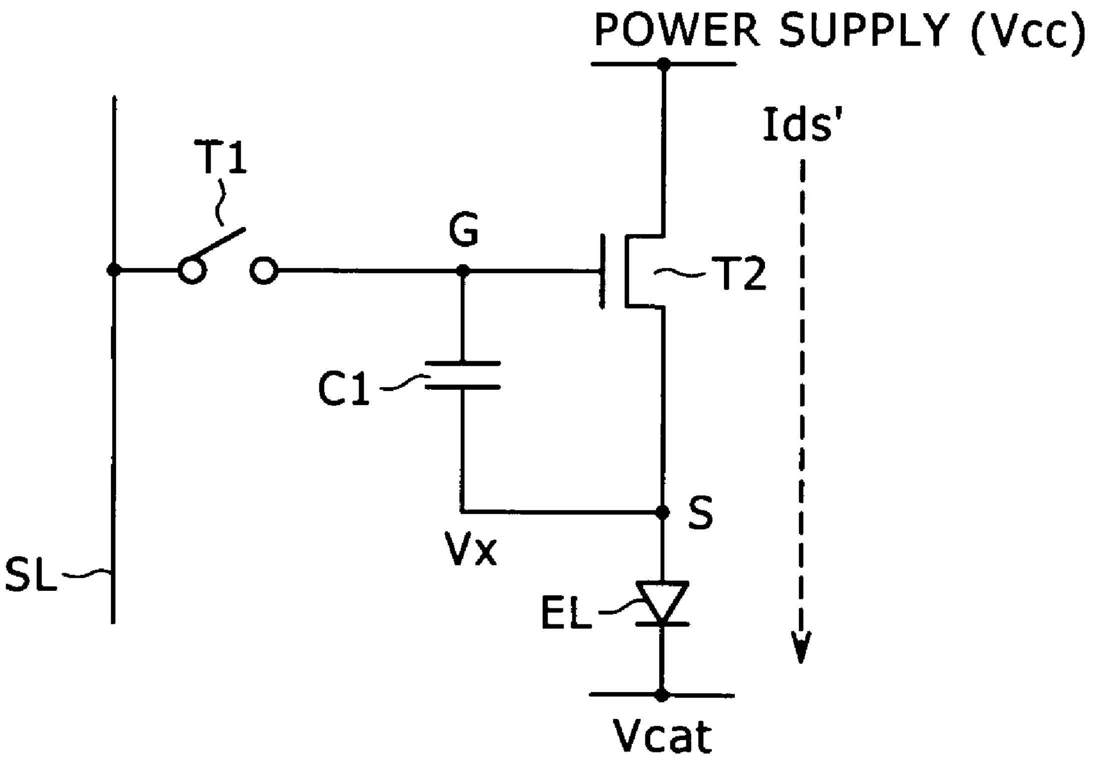
FIG. 12 is a schematic diagram for explaining the operation of the pixel shown in FIG. 2.

FIG. 12 shows the operation state in the light-emission period (7). In this light-emission period (7), the sampling transistor T1 is turned off to cause the light-emitting element EL to emit light. The gate voltage Vgs of the drive transistor T2 is kept constant, and the drive transistor T2 applies a constant current Ids' to the light-emitting element EL in accordance with the above-described characteristic equation. The anode voltage of the light-emitting element EL (i.e. the source potential of the drive transistor T2) is increased to Vx because the current Ids' flows to the light-emitting element EL, and the light-emitting element EL emits light at the timing when the anode voltage surpasses Vcat+Vthel. The current-voltage characteristic of the light-emitting element EL changes as the total light-emission time thereof becomes longer. Thus, the potential of the source S shown in FIG. 12 changes. However, the current Ids' flowing to the light-emitting element EL will not change because the gate voltage Vgs of the drive transistor T2 is kept at a constant value due to bootstrap operation. Therefore, even when the current-voltage characteristic of the light-emitting element EL deteriorates, the constant drive current Ids' typically flows continuously and hence the luminance of the light-emitting element EL will not change.

In the mobility correction for the drive transistor, generally the optimum mobility correction time is short when the signal potential Vsig is high (when white is to be displayed). In contrast, the optimum mobility correction time is long when the signal potential Vsig is not so high (when gray is to be displayed). Therefore, if the mobility correction time (i.e. the sampling time) is fixed irrespective of the signal potential Vsig, the optimum mobility correction may not be carried out for either white displaying or gray displaying. To address this problem, the above-described previously-developed technique example employs the two-stage system: the signal line potential is temporarily set to the intermediate potential Vofs2 before being switched from the reference potential Vofs to the signal potential Vsig. This allows optimization of the effective mobility correction time both for white displaying and gray displaying.

Figure 13B:
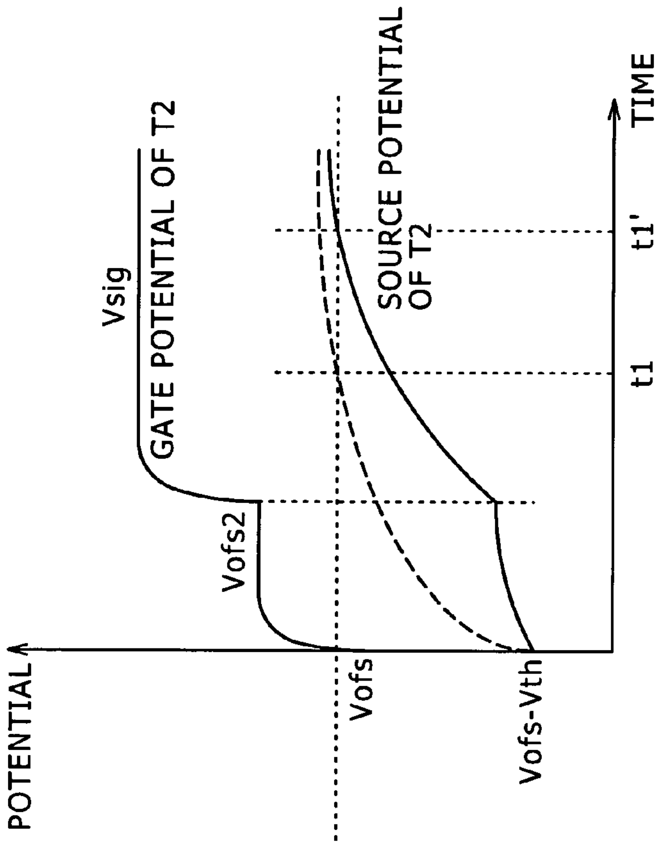
FIGS. 13A and 13B are graphs for explaining a two-stage system for mobility correction.
Figure 13A:
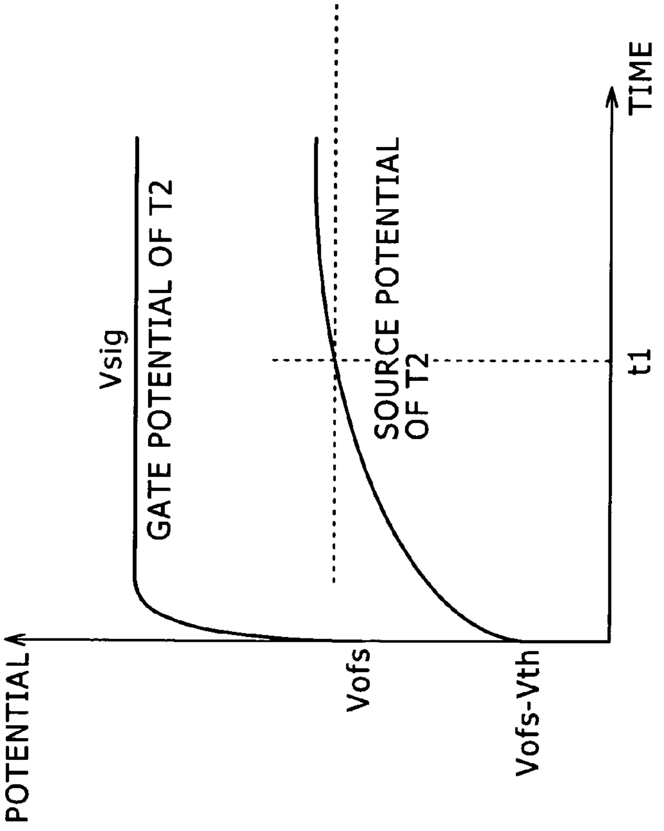

With reference to FIGS. 13A and 13B, the above-described two-stage system will be specifically described below. FIGS. 13A and 13B are schematic graphs showing mobility correction operation for white displaying. FIG. 13A shows the case in which the two-stage system is not employed, and FIG. 13B shows the case in which the two-stage system is employed. In either graph, elapsed time t is plotted on the abscissa, and the source potential and the gate potential of the drive transistor T2 are plotted on the ordinate. As shown in FIG. 13A, if the two-stage system is not employed, the source potential of the drive transistor T2 increases from Vofs−Vth along with time elapse after the sampling transistor T1 is turned on for switching of the gate potential of the drive transistor T2 from Vofs to Vsig. When the elapsed time t reached optimum correction time t1, the sampling transistor T1 is turned off, and the source potential of the drive transistor T2 at this timing is held. As described above, the optimum correction time t1 for white displaying is comparatively short.

On the other hand, in the two-stage system shown in FIG. 13B, the gate potential of the drive transistor T2 changes in two stages from the reference potential Vofs via the intermediate potential Vofs2 to the signal potential Vsig after the sampling transistor T1 is turned on. In linkage with this potential increase, the source potential of the drive transistor T2 also increases from Vofs−Vth. However, because of the intermediary of the intermediate potential Vofs2, the rising speed of the source potential of the drive transistor T2 (indicated by the full line) is lower than that when the two-stage system is not employed (indicated by the dotted line). Therefore, optimum mobility correction time t1' when the two-stage system is employed is longer than the optimum mobility correction time t1 when the two-stage system is not employed. That is, if the two-stage system is employed, the intermediary of the intermediate potential Vofs2 extends the optimum mobility correction time to the time t1'.

Figure 14B:
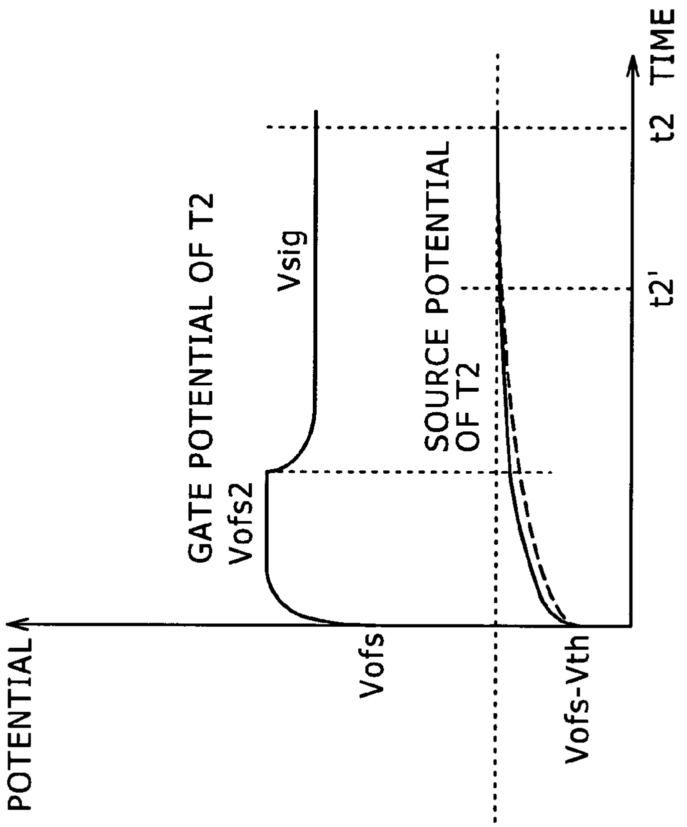
FIGS. 14A and 14B are graphs for explaining the two-stage system.
Figure 14A:
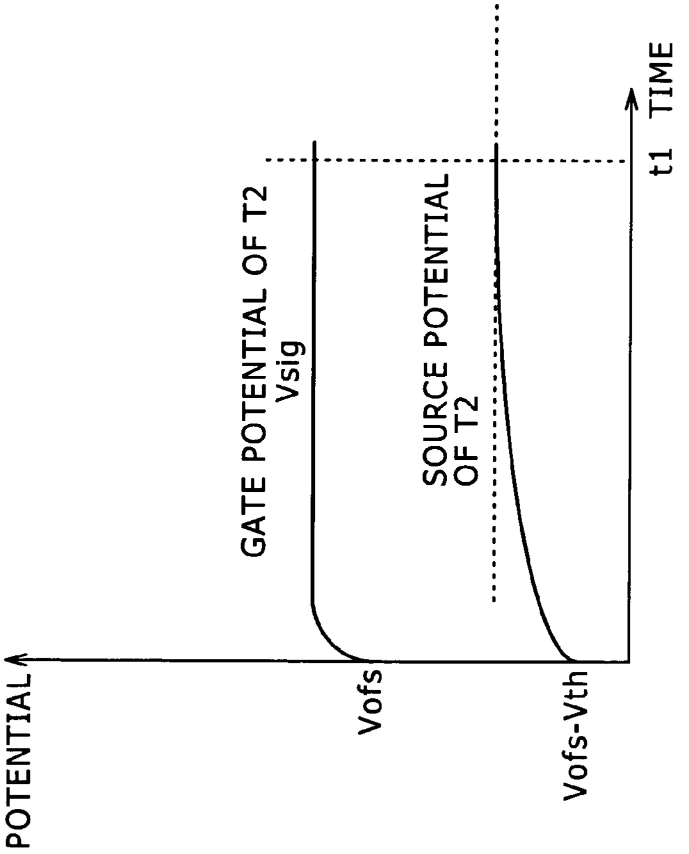

FIGS. 14A and 14B are graphs showing mobility correction operation for gray displaying. For FIGS. 14A and 14B, the same representation manner as that of the graphs of FIGS. 13A and 13B is employed for easy understanding. The level of the signal potential Vsig for gray displaying is comparatively low. In particular, Vsig for black displaying is almost equal to Vofs. As shown in FIG. 14A, if the two-stage system is not employed, optimum mobility correction time t2 is longer than the optimum mobility correction time t1 for white displaying.

As shown in FIG. 14B, if the two-stage system is employed for gray displaying, the gate potential of the drive transistor T2 increases from Vofs to Vofs2, and then decreases due to switching to Vsig. This is because the level of the intermediate potential Vofs2 is so designed as to be higher than that of the signal potential Vsig for gray displaying and black displaying. Therefore, as the rising speed of the source potential of the drive transistor T2, the speed when the two-stage system is employed, indicated by the full line, is higher than the speed when the two-stage system is not employed, indicated by the dotted line. Therefore, in the case of gray displaying, employing the two-stage system shortens the optimum mobility correction time from t2 to t2'. When taken together, employing the two-stage system extends the optimum mobility correction time that is originally short for white displaying, and shortens the optimum mobility correction time that is originally long for gray displaying. As a result, the optimum mobility correction can be carried out with a constant correction period irrespective of the grayscale. In other words, properly designing the level and the time width of the intermediate potential Vofs2 can substantially equalize the optimum mobility correction time t1' for white displaying to the optimum mobility correction time t2' for gray displaying.

As described above, the optimum mobility correction time for white displaying can be substantially matched with that for gray displaying by employing the two-stage system. This can suppress streaks and unevenness on the screen attributed to variation in the correction amount and thus can achieve uniform image quality. However, as a premise of the two-stage system, the signal line potential needs to accurately change from Vofs via Vofs2 to Vsig. If the waveform of the potential change of the signal line involves distortion, the accuracy of the mobility correction is deteriorated and an error arises, which leads to the occurrence of unevenness such as shading.

Figure 15:
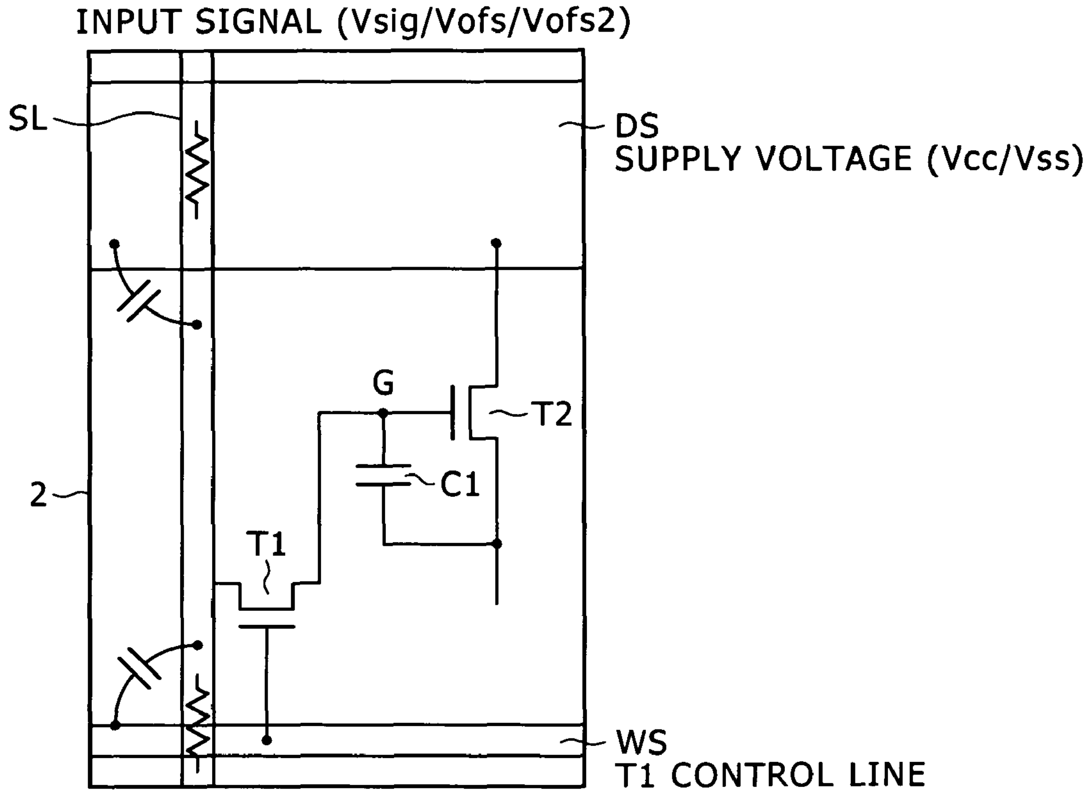
FIG. 15 is a schematic diagram for explaining the load of a signal line.

FIG. 15 is a circuit diagram schematically showing a phenomenon that causes waveform distortion of the signal line potential. As shown in FIG. 15, the pixel 2 is formed at the intersection of the signal line SL and the scan line WS. To the signal line SL, the video signal (Vsig/Vofs/Vofs2) is input from the signal driver (not shown) on the upper side of the pixel array part. The scan line WS serves as a control line for switching-on and -off of the sampling transistor T1. This scan line WS intersects with the signal line SL and floating capacitance arises therebetween. The power feed line DS also intersects with the signal line SL and floating capacitance arises therebetween. This power feed line DS is considerably larger than the scan line WS in thickness because it supplies the supply voltage (Vcc/Vss), and therefore the floating capacitance between it and the signal line SL is high. The signal line SL extends from the signal driver (not shown) on the input side toward the lower side as the input opposite side, and has predetermined interconnect resistance.

Because the power supply line having large thickness needs to be disposed in the pixel array part, the load of the signal line SL is heavy as shown in FIG. 15. Therefore, the video signal supplied to the signal line SL involves large distortion, and the signal waveform thereof becomes greatly-distorted on the signal input opposite side compared with on the signal input terminal side. Due to the distortion of the signal line waveform, difference in the gate-source voltage Vgs of the drive transistor T2 exists between the signal input side and the input opposite side at the time of writing of the signal potential Vsig, which causes image quality deterioration such as shading.

Figure 16:
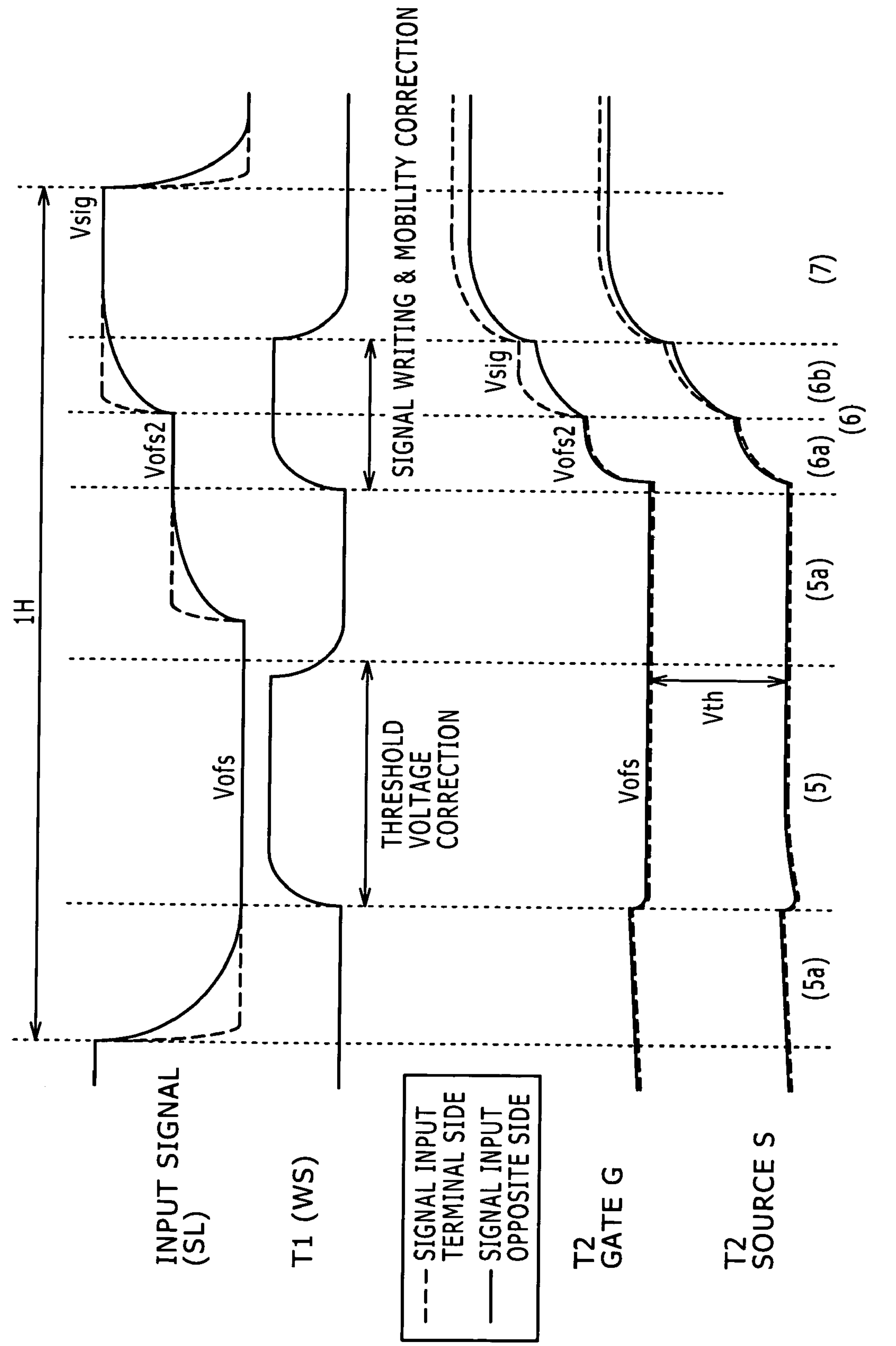
FIG. 16 is a timing chart showing major part of operation sequence of a display device according to a reference example.

FIG. 16 is a timing chart schematically showing the influence of signal waveform distortion. In this timing chart, potential changes on the signal input terminal side are indicated by dotted lines, and those on the signal input opposite side are indicated by full lines. As shown in FIG. 16, the sampling transistor T1 is turned on in the signal writing & mobility correction period (6). In the two-stage system, this mobility correction period (6) is divided into a former period (6*a*) and a latter period (6*b*). In the former period (6*a*), the input signal is set to Vofs2. In the latter period (6*b*), the input signal is switched to Vsig. At the time of the switching from Vofs2 to Vsig, due to the influence of the load of the signal line, the waveform of the signal potential Vsig on the signal input opposite side, indicated by the full line, becomes greatly-distorted compared with on the signal input terminal side, indicated by the dotted line. Due to the influence of the waveform distortion, the potential of the gate G of the drive transistor T2 on the signal input opposite side has not yet reached Vsig as the target level at the end timing of the signal writing & mobility correction period (6), and difference from the signal input terminal side arises. The potential of the source S of the drive transistor T2 also changes slightly due to the influence of the potential of the gate G. However, the difference in the resulting potential of the source S between the signal input opposite side and the signal input terminal side is smaller than that in the resulting potential of the gate G therebetween. This results in difference in the gate-source voltage Vgs of the drive transistor T2 between the signal input terminal side and the signal input opposite side, which causes unevenness of the luminance. This luminance unevenness appears as shading from the signal input terminal side on the upper side of the screen toward the signal input opposite side on the lower side of the screen.

Figure 17:
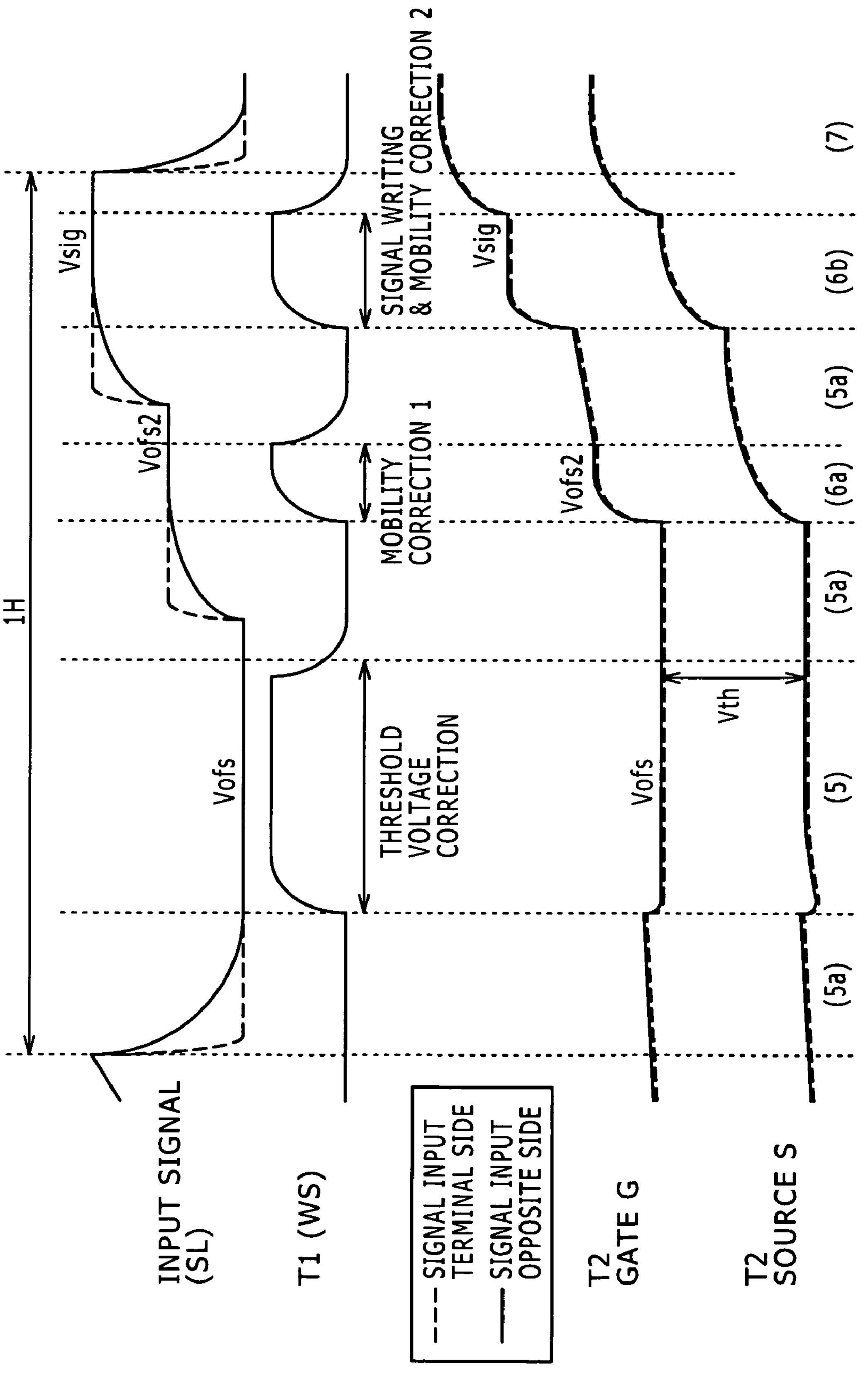
FIG. 17 is a timing chart showing operation sequence of a display device according to an embodiment of the present invention.

FIG. 17 is a timing chart showing operation sequence of a display device according to an embodiment of the present invention. For FIG. 17, the same representation manner as that of the timing chart of the operation sequence according to the previously-developed technique shown in FIG. 16 is employed, for easy understanding. Specifically, the dotted-line curves indicate waveforms on the signal input terminal side, and the full-line curves indicate waveforms on the signal input opposite side. As shown in FIG. 17, the present embodiment also employs the two-stage system. Specifically, for writing of the video signal to the hold capacitor, the signal driver switches the potential of the signal line SL from the reference potential Vofs to the intermediate potential Vofs2, and then switches the potential to the signal potential Vsig of the video signal. The write scanner supplies a first control signal pulse to the scan line WS to thereby turn on and off the sampling transistor T1 when the signal line SL is at the intermediate potential Vofs2. Subsequently, the write scanner supplies a second control signal pulse to thereby turn on and off the sampling transistor T1 when the signal line SL is at the signal potential Vsig. This operation allows the mobility correction period to be divided into a former period (6*a*) and a latter period (6*b*). In the former period (6*a*), first mobility correction operation (Mobility correction 1) is carried out. In the latter period (6*b*), second mobility correction operation (Mobility correction 2) and signal writing operation are simultaneously carried out.

As is apparent from this timing chart, the former period (6*a*) and the latter period (6*b*) are separated from each other by an intermediate period (5*a*). In this intermediate period (5*a*), the sampling transistor T1 is kept at the off-state during the period from the falling-down of the first control signal pulse to the rising-up of the second control signal pulse. During the intermediate period (5*a*), the potential of the gate G of the drive transistor T2 as the control terminal thereof increases in such a way that the potential difference Vgs from the potential of the current terminal of the drive transistor T2 as the source S thereof is kept constant. Although the video signal waveform on the signal input terminal side is greatly different from that on the signal input opposite side in the intermediate period (5*a*), the potentials of the drive transistor T2 are not affected by the input signal waveform at all because Vgs is kept at a constant value. Therefore, in the present embodiment, although the video signal waveform becomes greatly-distorted on the signal input opposite side, the gate-source voltage of the drive transistor T2 can be kept constant without being affected by the waveform distortion. Consequently, unevenness such as shading between the signal input terminal side and the signal input opposite side does not occur, but uniform image quality can be achieved.

Figure 18:
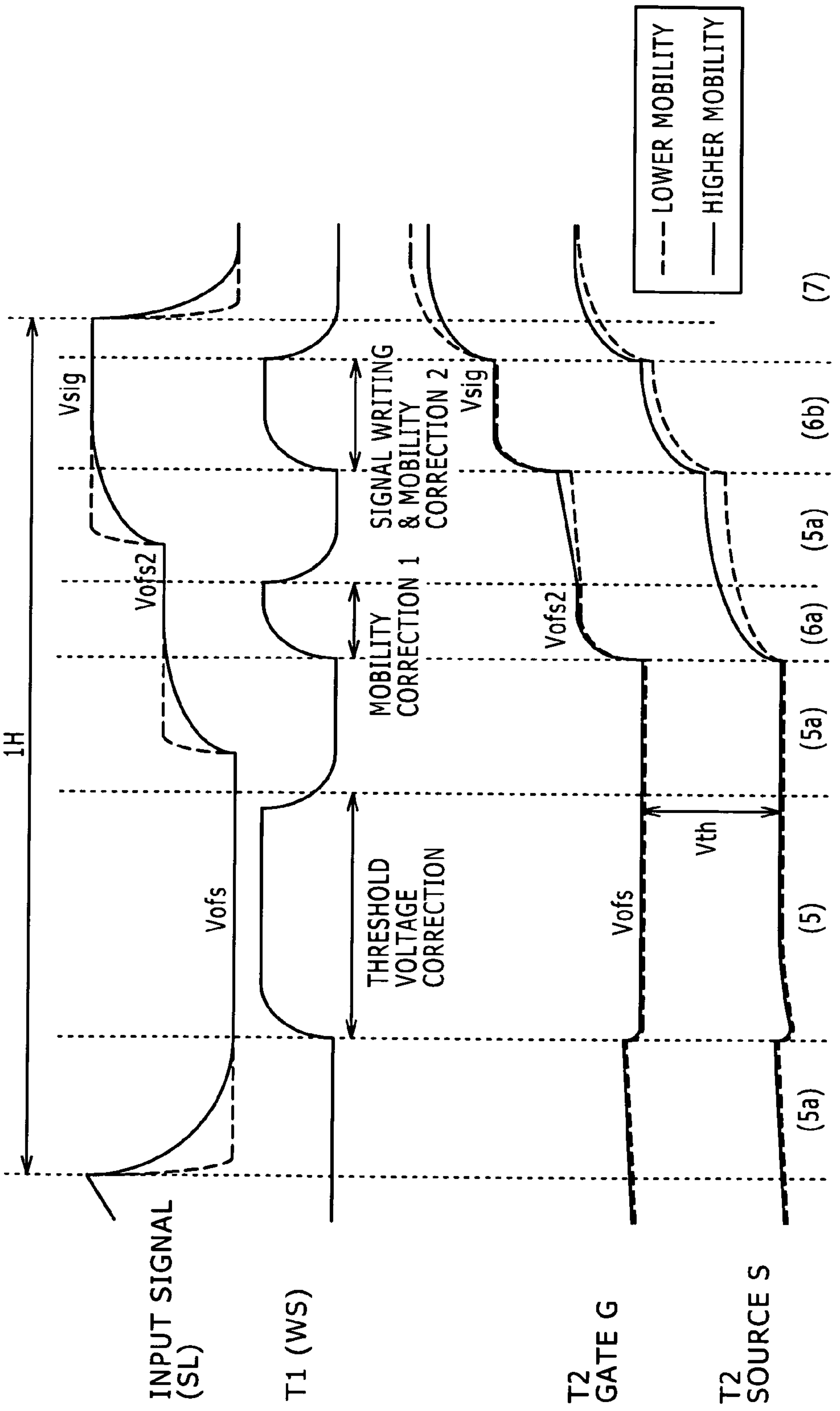
FIG. 18 is a timing chart for explaining the operation of the display device according to the embodiment.

FIG. 18 is a timing chart showing operation sequence according to the present embodiment based on comparison between the case in which the mobility is lower and the case in which the mobility is higher. For FIG. 18, the same representation manner as that of the timing chart of FIG. 17 is employed for easy understanding. In the timing chart of FIG. 18, the potential changes of the drive transistor T2 when the mobility is lower are indicated by dotted lines, and those when the mobility is higher are indicated by full lines. First, by turning on the sampling transistor T1 after the input signal is switched to Vofs2, the intermediate potential Vofs2 can be input to the gate of the drive transistor T2 irrespective of signal distortion. At this time, the first-stage correction of the two-stage mobility correction is carried out because the intermediate potential Vofs2 is set to an intermediate grayscale level. By turning off the sampling transistor T1 after the elapse of a constant period, the gate potential and the source potential of the drive transistor T2 can be settled irrespective of signal distortion of the signal line SL. At this time, the gate-source voltage Vgs of the drive transistor T2 is higher than the threshold voltage, and therefore the gate potential and the source potential of the drive transistor T2 start to increase in response to the turning-off of the sampling transistor T1. At this time, the current through the drive transistor T2 is used to charge the capacitors C1 and Cel if the source potential does not surpasses the sum of the threshold voltage Vthel and the cathode voltage Vcat of the light-emitting element EL (if the leakage current of the light-emitting element EL is considerably smaller than the current flowing through the drive transistor T2). The increases in the gate potential and the source potential of the drive transistor T2 reflect the mobility μ of the drive transistor T2 because the mobility correction has not yet been completed through the first mobility correction operation. Specifically, the increase amount of the source potential is larger in the drive transistor T2 having higher mobility μ, and it is smaller in the drive transistor T2 having lower mobility μ.

Thereafter, after the signal line potential is switched to Vsig, the sampling transistor T1 is turned on again to thereby input the signal potential Vsig to the gate of the drive transistor T2. Immediately before the turning-on of the sampling transistor T1, the source potential of the drive transistor T2 having lower mobility is lower than that of the drive transistor T2 having higher mobility. Therefore, immediately after the inputting of the signal to the gate G of the drive transistor T2, the gate-source voltage Vgs of the drive transistor T2 having lower mobility is higher and thus a larger current flows through the drive transistor T2 having lower mobility. That is, the increase amount of the potential of the source S is larger in the drive transistor T2 having lower mobility. Thus, the gate-source voltage Vgs of the drive transistor T2 becomes the value reflecting the mobility thereof after the elapse of a constant time; the mobility correction can be carried out. Furthermore, because the mobility correction and the signal writing are carried out after the signal is switched to the desired potential, unevenness such as shading between the signal input side and the input opposite side due to signal distortion does not occur. This allows achievement of uniform image quality.

Figure 19:
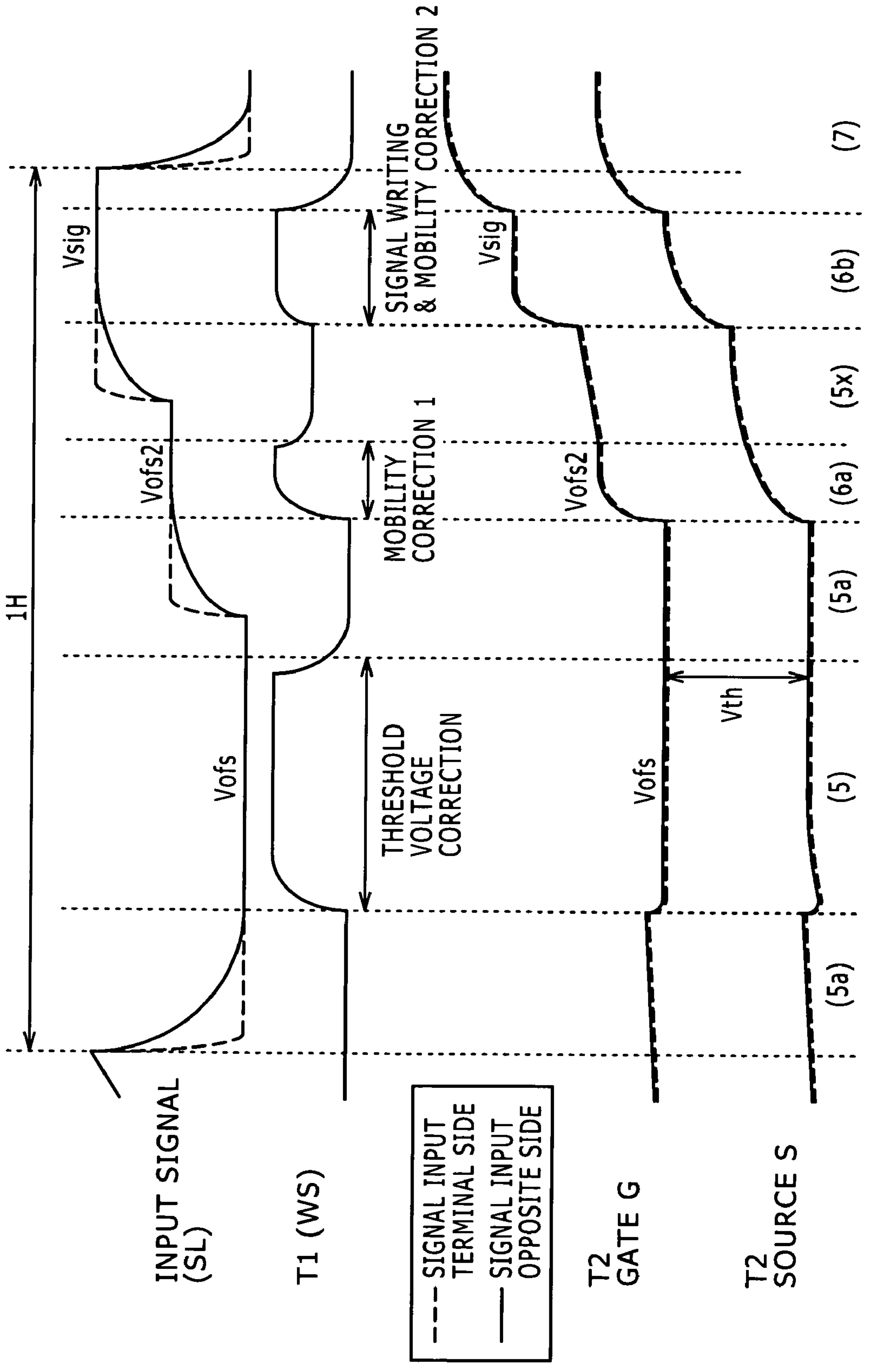
FIG. 19 is a timing chart showing operation sequence of a display device according to another embodiment of the present invention.

FIG. 19 is a timing chart showing operation sequence of a display device according to another embodiment of the present invention. The present embodiment is an improvement on the above-described embodiment shown in FIG. 17. For FIG. 19, the same representation manner as that of FIG. 17 is employed for easy understanding. The timing chart of FIG. 19 shows operation sequence for white displaying. The dotted lines indicate waveform changes on the signal input terminal side and the full lines indicate waveform changes on the signal input opposite side. In the present embodiment, at the end of the first mobility correction operation (Mobility correction 1), the gate potential of the sampling transistor T1 is not set to the completely-off potential, but the potential is so set that the sampling transistor T1 is turned off at least when white is to be displayed. Due to this setting, unevenness such as shading does not occur when white is to be displayed like the above-described embodiment shown in FIG. 17.

As described above, in the present embodiment, the write scanner keeps the potential of the scan line WS at a predetermined potential during the period from the falling-down of the first control signal pulse to the rising-up of the second control signal pulse. Thereby, if the signal potential Vsig is higher than the potential obtained by subtracting the threshold voltage of the sampling transistor T1 from this predetermined potential, the sampling transistor T1 is turned on in response to the rising-up of the first control signal pulse and turned off in response to the falling-down thereof. Subsequently, the sampling transistor T1 is turned on in response to the rising-up of the second control signal pulse and turned off in response to the falling-down thereof. The present embodiment is different from the above-described embodiment shown in FIG. 17 in that, in an intermediate period (5*x*) between a former period (6*a*) and a latter period (6*b*), the gate potential of the sampling transistor T1 is set to not the off potential but the predetermined potential that causes the sampling transistor T1 to be turned off in the intermediate period (5*x*) when white is to be displayed.

Figure 20:
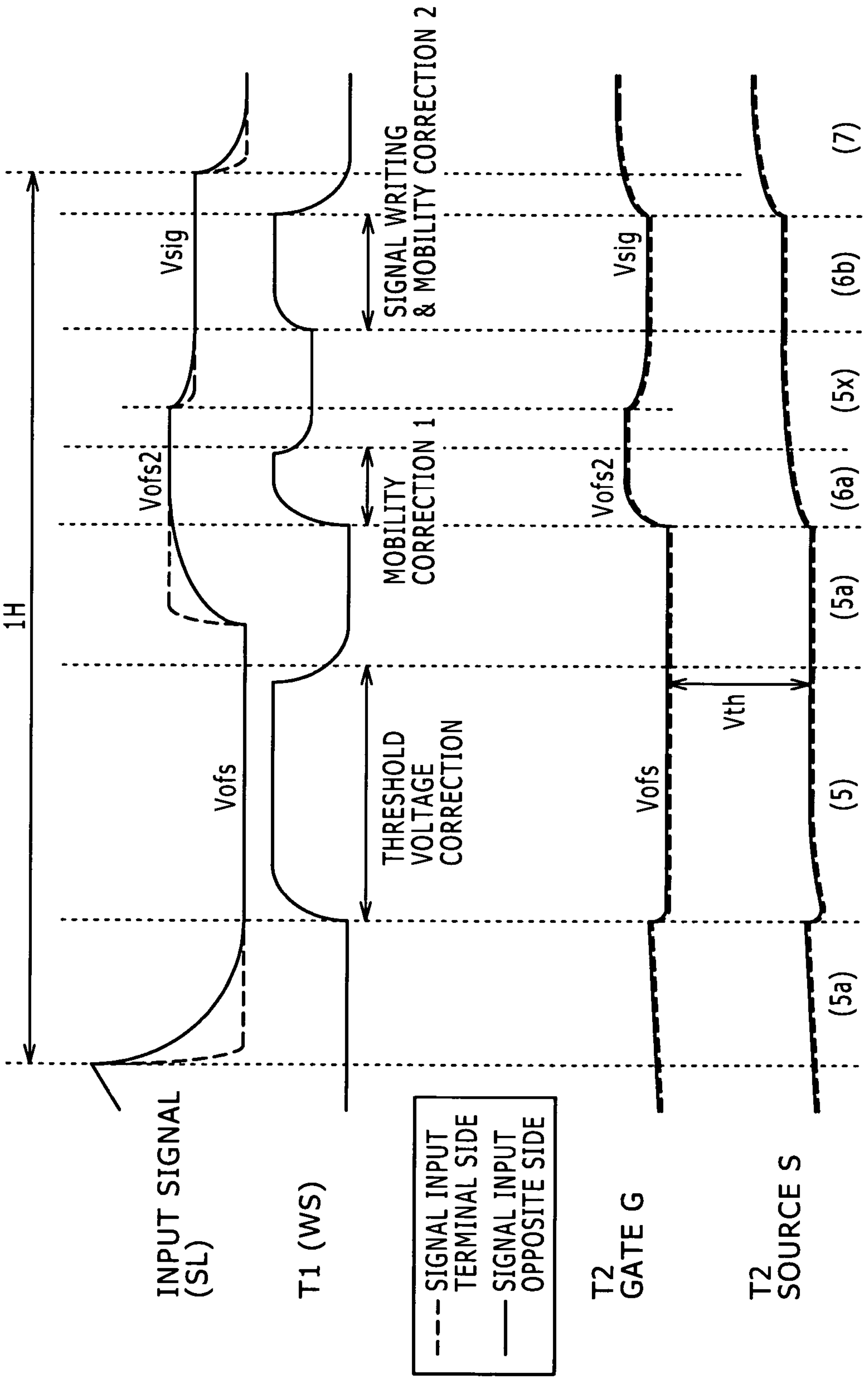
FIG. 20 is a timing chart showing the operation of the display device according to the another embodiment.

FIG. 20 shows operation sequence of the embodiment shown in FIG. 19 when the signal potential has the level for black displaying. The signal potential Vsig for black displaying is lower than that for white displaying. If the signal potential Vsig is lower than the potential obtained by subtracting the threshold voltage of the sampling transistor T1 from the predetermined potential, the sampling transistor T1 is kept at the on-state during the period from the rising-up of the first control signal pulse to the falling-down of the second control signal pulse. As shown in the timing chart, when black is to be displayed, the sampling transistor T1 is in the on-state not merely in the former period (6*a*) and the latter period (6*b*) of the mobility correction operation but also in the intermediate period (5*x*). By thus setting the total mobility correction time for black displaying longer than that for white displaying, the mobility correction amount can be optimized. However, if the sampling transistor T1 is kept at the on-state in the intermediate period (5*x*), the potentials of the drive transistor T2 are possibly affected by waveform distortion of the signal line SL. However, in practice, the signal distortion amount is small when black is to be displayed, and therefore visually-recognizable unevenness such as shading does not occur on the screen. Thus, employing the setting of the gate potential of the sampling transistor T1 shown in FIG. 20 can extend the mobility correction time for black displaying. The optimum mobility correction time for black displaying tends to be longer than that for gray displaying.

Figure 21:
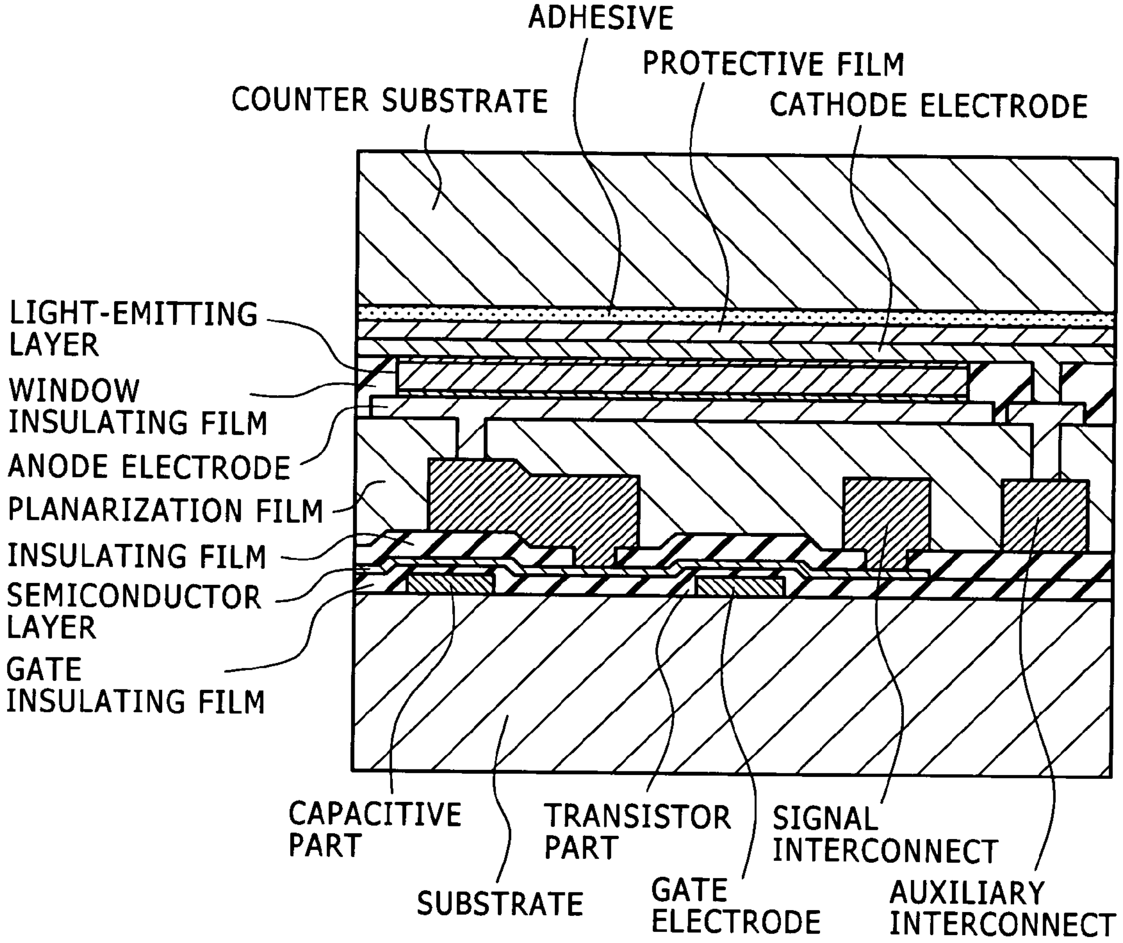
FIG. 21 is a sectional view showing the device structure of the display device according to the embodiment of the present invention.

The display device according to the embodiment of the present invention has a thin film device structure-like that shown in FIG. 21. FIG. 21 shows the schematic sectional structure of a pixel formed over an insulating substrate. As shown in FIG. 21, the pixel includes a transistor part having plural thin film transistors (one TFT is shown in FIG. 21), a capacitive part such as a hold capacitor, and a light-emitting part such as an organic EL element. The transistor part and the capacitive part are formed on the substrate by a TFT process, and the light-emitting part such as an organic EL element is stacked thereon. A transparent counter substrate is attached over the light-emitting part with the intermediary of an adhesive, so that a flat panel is obtained.

Figure 22:
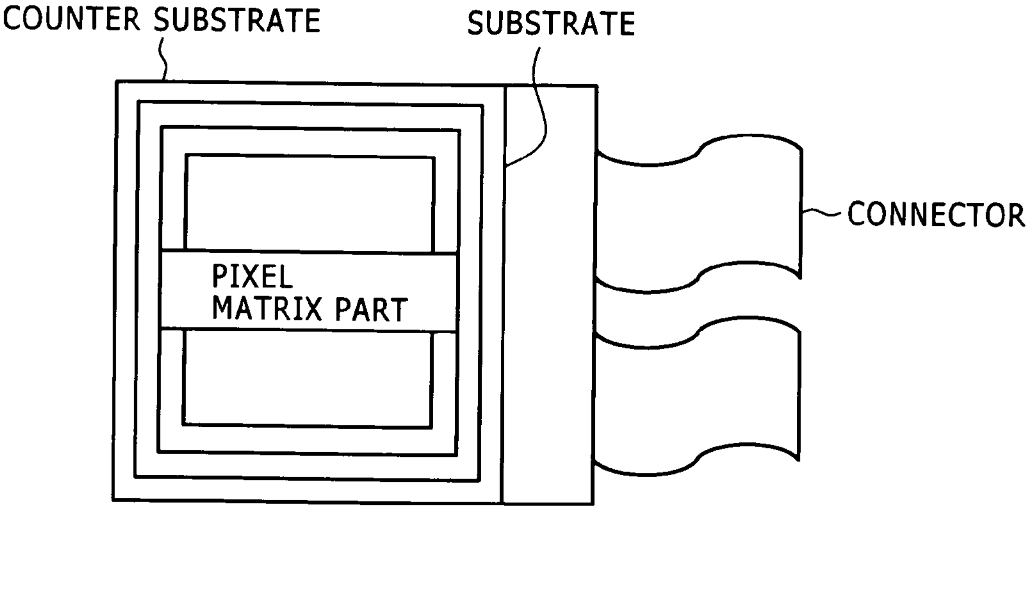
FIG. 22 is a plan view showing the module structure of the display device according to the embodiment of the present invention.

The display device according to the embodiment of the present invention encompasses a display module having a flat module shape like that shown in FIG. 22. For example, this display module is formed as follows. A pixel array part in which pixels each including an organic EL element, thin film transistors, a thin film capacitor, and so on are integrally formed into a matrix is provided on an insulating substrate. An adhesive is so disposed as to surround this pixel array part (pixel matrix part), and a counter substrate composed of glass or the like is bonded to the substrate of the pixel array part. This transparent counter substrate may be provided with e.g. a color filter, protective film, and light-blocking film according to need. The display module may be provided with e.g. a flexible printed circuit (FPC) as a connector for inputting/outputting of signals and so forth to/from the pixel array part from/to the external.

The display device according to the above-described embodiment can be applied to a display that has a flat panel shape and is incorporated in various kinds of electronic apparatus in any field that displays image or video based on a video signal input to the electronic apparatus or produced in the electronic apparatus, such as a digital camera, notebook personal computer, cellular phone, and video camera. Examples of such electronic apparatus to which the display device is applied will be described below.

Figure 23:
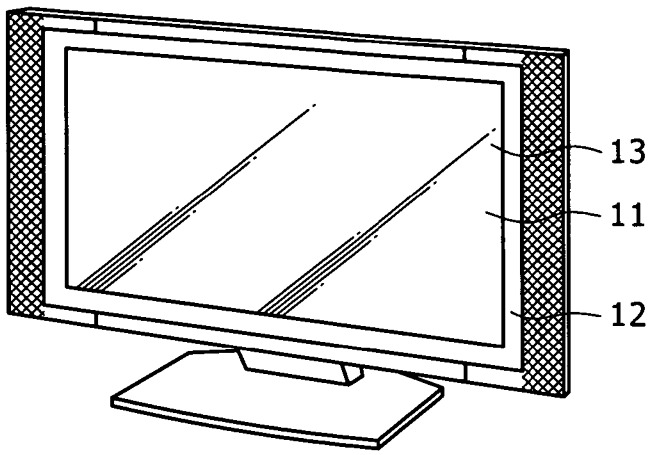
FIG. 23 is a perspective view showing a television set including the display device according to the embodiment of the present invention.

FIG. 23 shows a television to which the embodiment of the present invention is applied. This television includes a video display screen 11 composed of a front panel 12, a filter glass 13, and so on, and is fabricated by using the display device according to the embodiment of the present invention as the video display screen 11.

Figure 24:
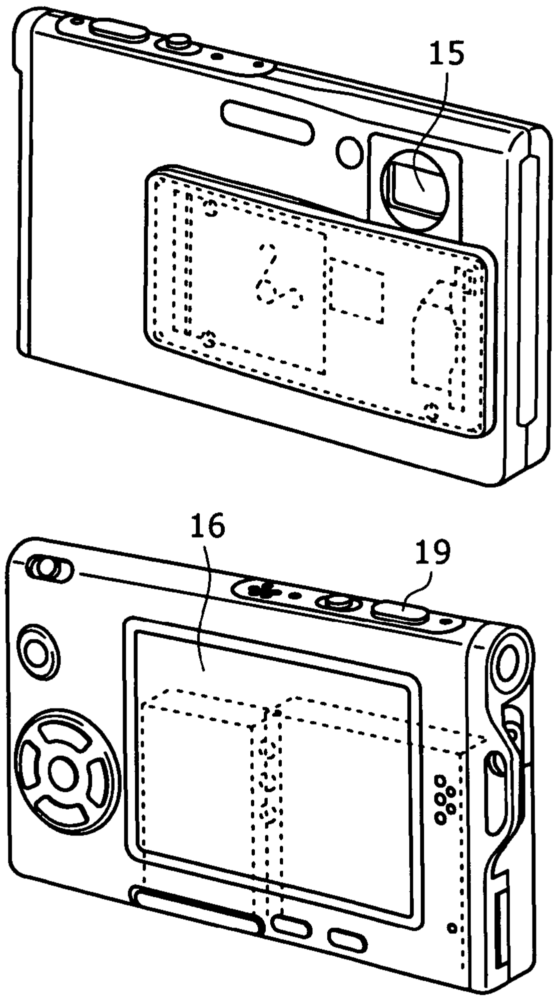
FIG. 24 is a perspective view showing a digital still camera including the display device according to the embodiment of the present invention.

FIG. 24 shows a digital camera to which the embodiment of the present invention is applied: the upper diagram is a front view and the lower diagram is a rear view. This digital camera includes an imaging lens, a light emitter 15 for flash, a display part 16, a control switch, a menu switch, a shutter button 19, and so on, and is fabricated by using the display device according to the embodiment of the present invention as the display part 16.

Figure 25:
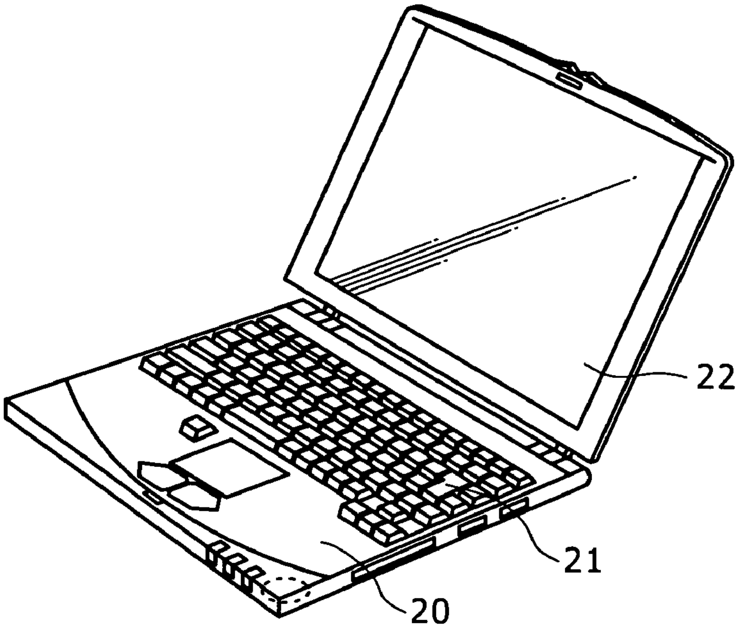
FIG. 25 is a perspective view showing a notebook personal computer including the display device according to the embodiment of the present invention.

FIG. 25 shows a notebook personal computer to which the embodiment of the present invention is applied. A main body 20 thereof includes a keyboard 21 that is operated in inputting of characters and so on, and the body cover thereof includes a display part 22 for image displaying. This notebook personal computer is fabricated by using the display device according to the embodiment of the present invention as the display part 22.

Figure 26:
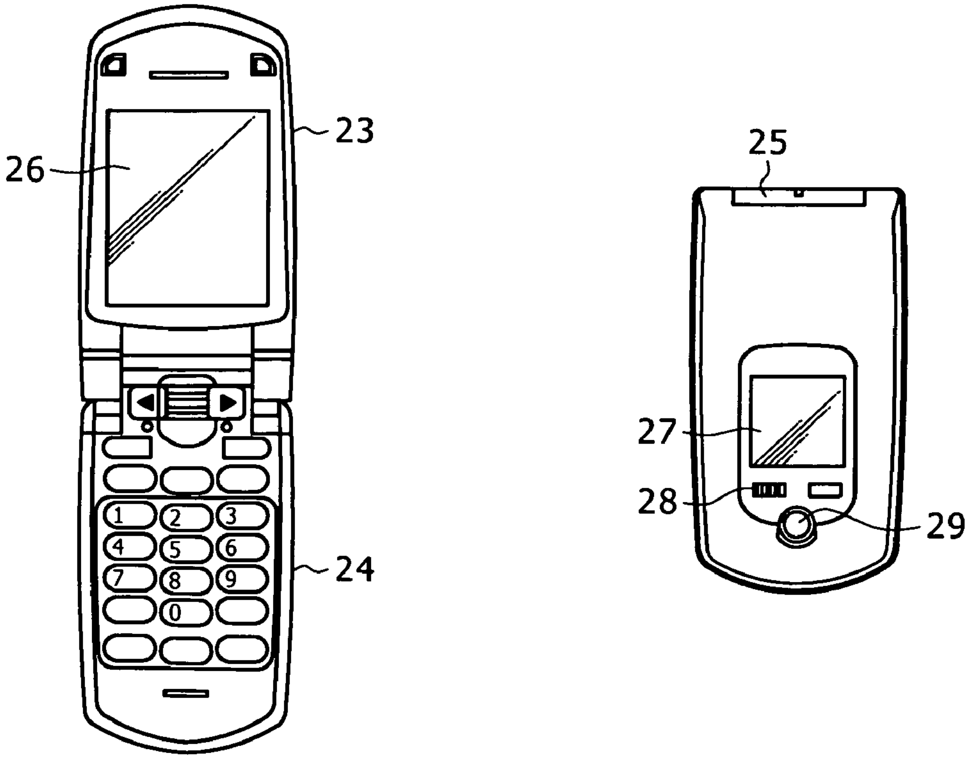
FIG. 26 is a schematic diagram showing portable terminal apparatus including the display device according to the embodiment of the present invention.

FIG. 26 shows portable terminal apparatus to which the embodiment of the present invention is applied: the left diagram shows the opened state and the right diagram shows the closed state. This portable terminal apparatus includes an upper casing 23, a lower casing 24, a connection (hinge) 25, a display 26, a sub-display 27, a picture light 28, a camera 29, and so on. This portable terminal apparatus is fabricated by using the display device according to the embodiment of the present invention as the display 26 and the sub-display 27.

Figure 27:
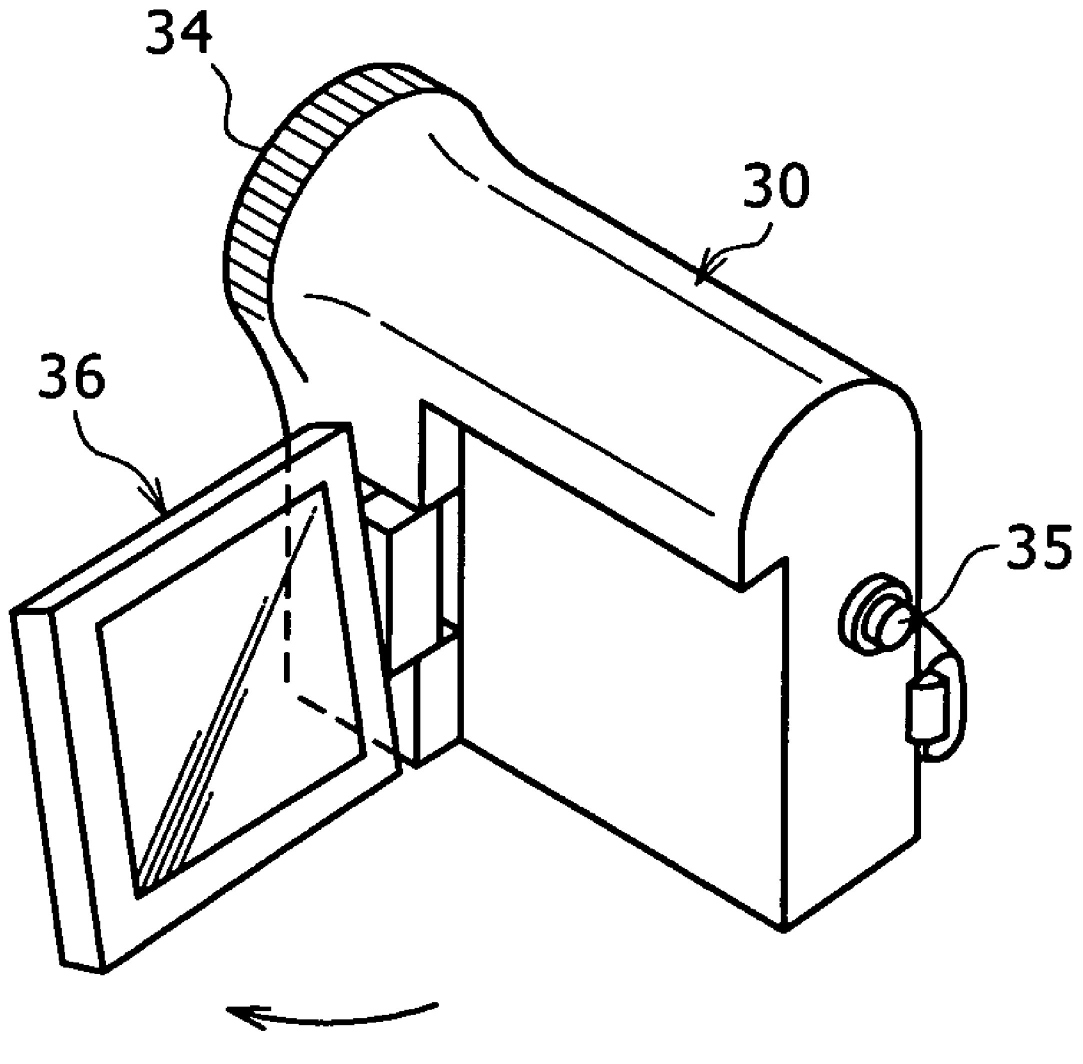
FIG. 27 is a perspective view showing a video camera including the display device according to the embodiment of the present invention.
Figure 28:
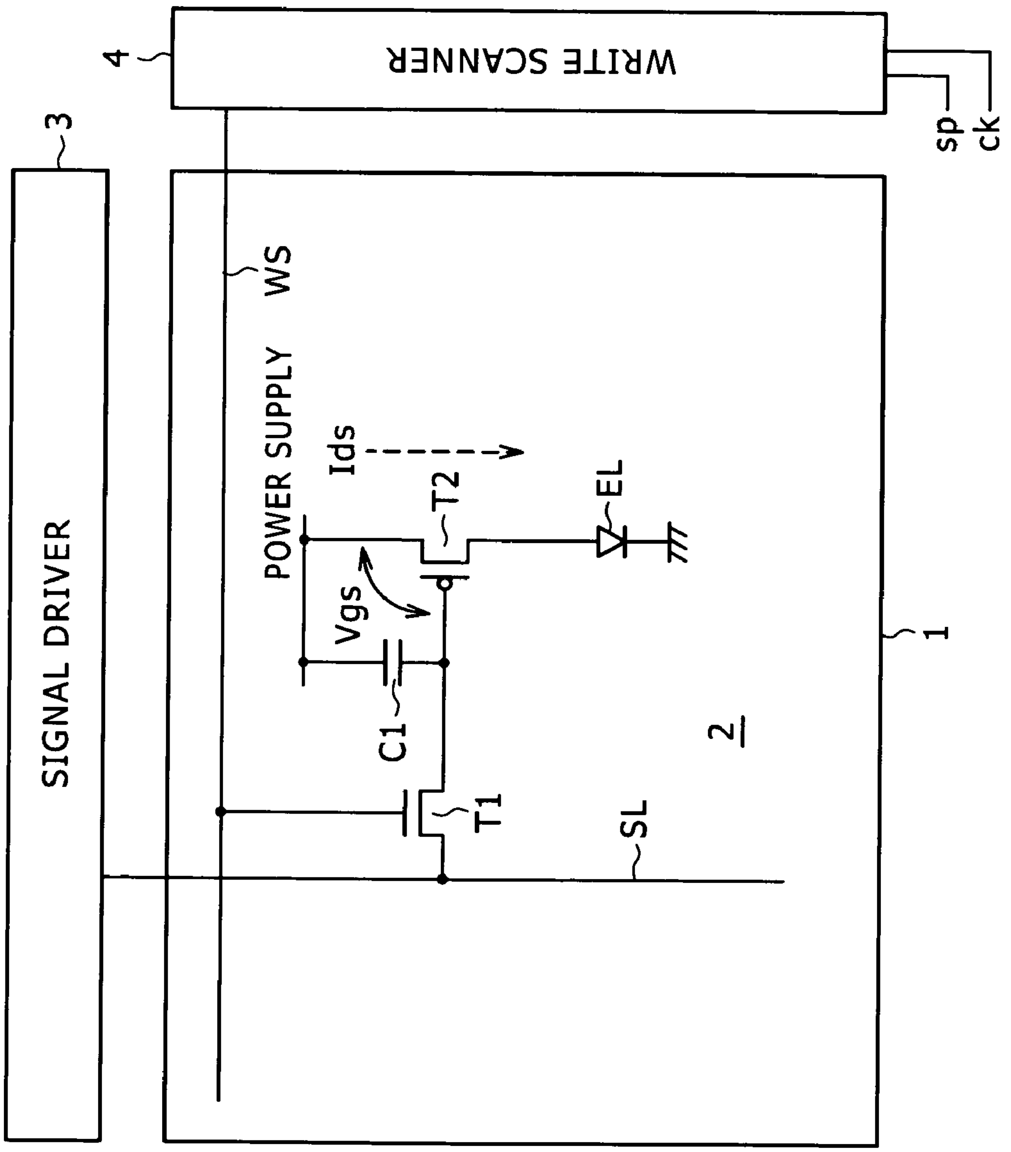
FIG. 28 is a circuit diagram showing one example of a related-art display device.
Figure 29:
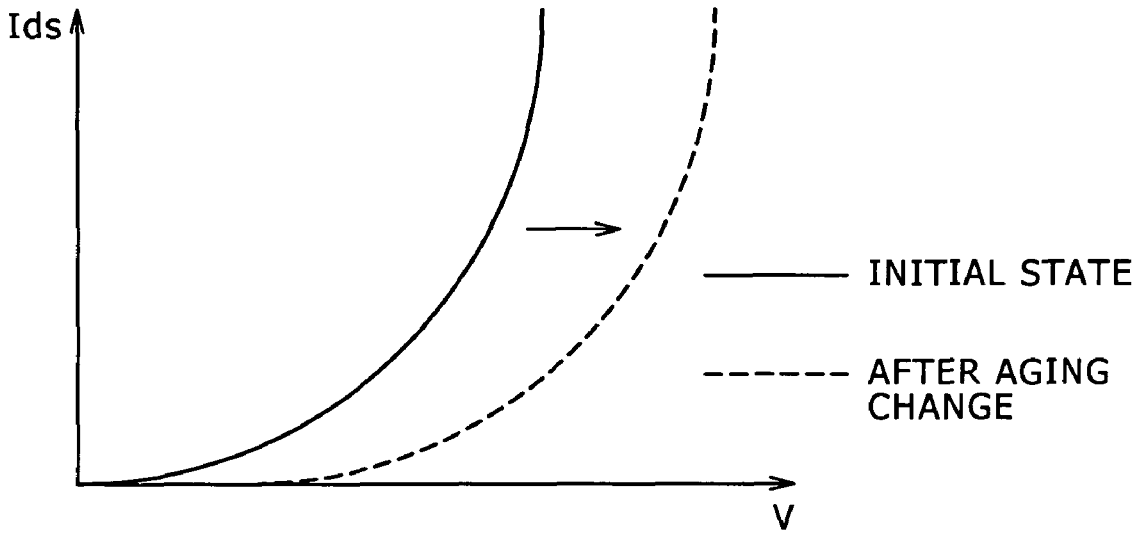
FIG. 29 is a graph showing a problem in the related-art display device.
Figure 30:
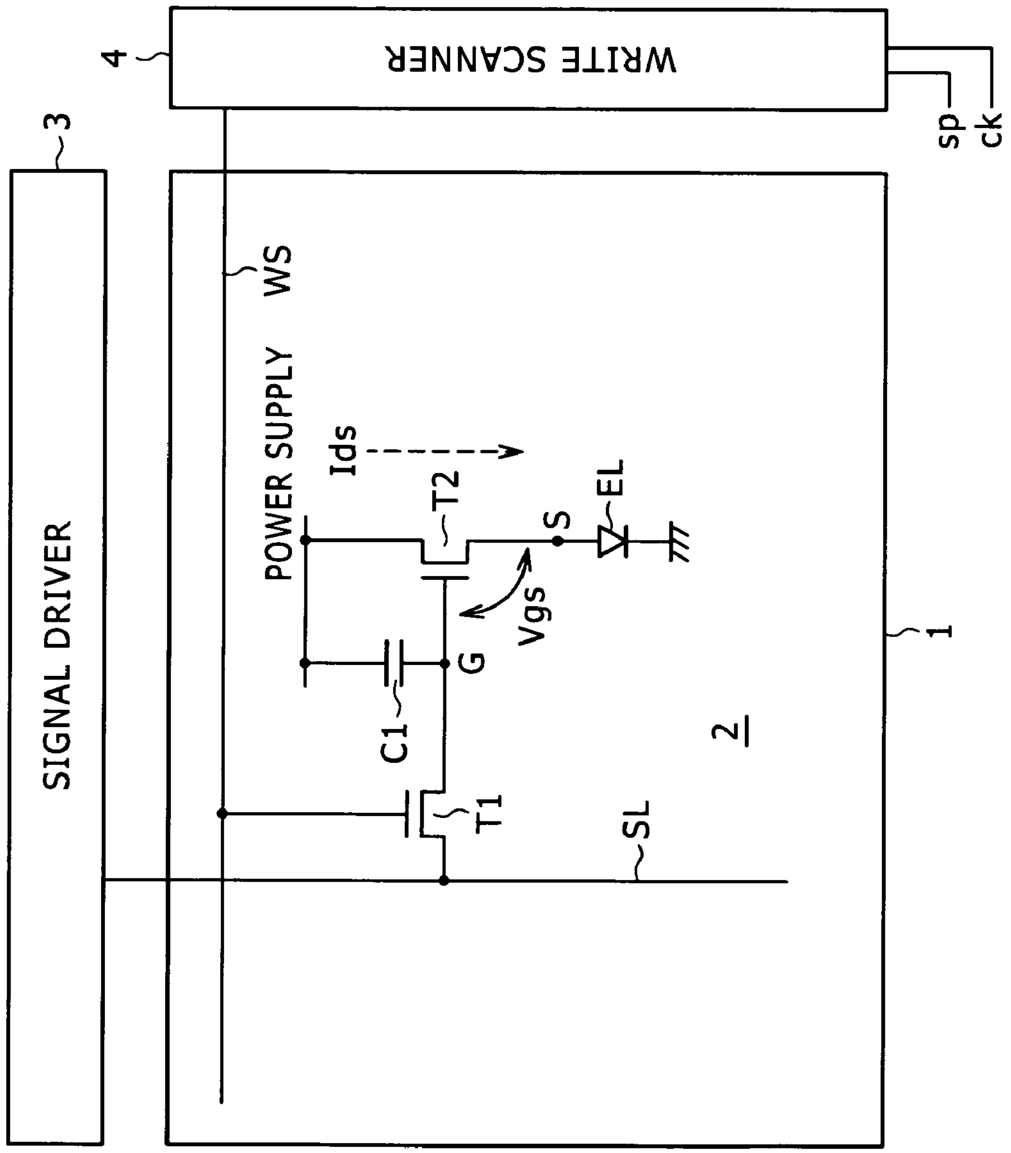
FIG. 30 is a circuit diagram showing another example of the related-art display device.

FIG. 27 shows a video camera to which the embodiment of the present invention is applied. This video camera includes a main body 30, a lens 34 that is disposed on the front side of the camera and used to capture a subject image, a start/stop switch 35 for imaging operation, a monitor 36, and so on. This video camera is fabricated by using the display device according to the embodiment of the present invention as the monitor 36.

It should be understood by those skilled in the art that various modifications, combinations, sub-combinations and alterations may occur depending on design requirements and other factor in so far as they are within the scope of the appended claims or the equivalents thereof.

What is claimed is:

1. A display device comprising:

a pixel array part configured to include scan lines disposed along rows, signal lines disposed along columns, and pixels that are disposed at intersections of the scan lines and the signal lines and arranged in a matrix; and a drive part configured to drive the pixels via the scan lines and the signal lines, wherein the pixel includes at least a sampling transistor, a drive transistor, a hold capacitor, and a light-emitting element, a control terminal of the sampling transistor is connected to the scan line, and a pair of current terminals of the sampling transistor are connected between the signal line and a control terminal of the drive transistor, a current terminal of the drive transistor is connected to the light-emitting element, the hold capacitor is connected between the control terminal of the drive transistor and the current terminal of the drive transistor, the drive part has a scanner that sequentially supplies a control signal to the scan lines and a driver that supplies a video signal to the signal lines, in the pixel, the sampling transistor is turned on in response to the control signal to sample the video signal and write the video signal to the hold capacitor, and a current that flows through the drive transistor at the time of the writing of the video signal is subjected to negative feedback to the hold capacitor from the current terminal of the drive transistor to carry out correction for mobility of the drive transistor, and a drive current is supplied from the drive transistor to the light-emitting element depending on a corrected video signal following the correction, the driver switches a potential of the signal line from a reference potential to an intermediate potential before switching the potential of the signal line to a signal potential of the video signal, for the writing of the video signal to the hold capacitor, and the scanner supplies a first control signal pulse to turn on and off the sampling transistor when the signal line is at the intermediate potential, and then supplies a second control signal pulse to turn on and off the sampling transistor when the signal line is at the signal potential, wherein said intermediate potential is different from said reference potential and said signal potential, and said intermediate potential is between said reference potential and said signal potential.

2. The display device according to claim 1, wherein the scanner keeps a potential of the scan line at a predetermined potential during a period from falling-down of the first control signal pulse to rising-up of the second control signal pulse, if the signal potential is higher than a potential obtained by subtracting a threshold voltage of the sampling transistor from the predetermined potential, the sampling transistor is turned on in response to rising-up of the first control signal pulse and turned off in response to the falling-down of the first control signal pulse, and then the sampling transistor is turned on in response to the rising-up of the second control signal pulse and turned off in response to falling-down of the second control signal pulse, and if the signal potential is lower than the potential obtained by subtracting the threshold voltage of the sampling transistor from the predetermined potential, the sampling transistor is kept at an on-state during a period from the rising-up of the first control signal pulse to the falling-down of the second control signal pulse.

3. The display device according to claim 1, wherein the sampling transistor is kept at an off-state during a period from falling-down of the first control signal pulse to rising-up of the second control signal pulse, and during the period, a potential of the control terminal of the drive transistor increases in such a way that potential difference between the control terminal of the drive transistor and the current terminal of the drive transistor is kept constant.

4. An Electronic apparatus comprising a display device including a pixel array part configured to include scan lines disposed along rows, signal lines disposed along columns, and pixels that are disposed at intersections of the scan lines and the signal lines and arranged in a matrix;

and a drive part configured to drive the pixels via the scan lines and the signal lines, wherein the pixel includes at least a sampling transistor, a drive transistor, a hold capacitor, and a light-emitting element, a control terminal of the sampling transistor is connected to the scan line, and a pair of current terminals of the sampling transistor are connected between the signal line and a control terminal of the drive transistor, a current terminal of the drive transistor is connected to the light-emitting element, the hold capacitor is connected between the control terminal of the drive transistor and the current terminal of the drive transistor, the drive part has a scanner that sequentially supplies a control signal to the scan lines and a driver that supplies a video signal to the signal lines, in the pixel, the sampling transistor is turned on in response to the control signal to sample the video signal and write the video signal to the hold capacitor, and a current that flows through the drive transistor at the time of the writing of the video signal is subjected to negative feedback to the hold capacitor from the current terminal of the drive transistor to carry out correction for mobility of the drive transistor, and a drive current is supplied from the drive transistor to the light-emitting element depending on a corrected video signal following the correction, the driver switches a potential of the signal line from a reference potential to an intermediate potential before switching the potential of the signal line to a signal potential of the video signal, for the writing of the video signal to the hold capacitor, and the scanner supplies a first control signal pulse to turn on and off the sampling transistor when the signal line is at the intermediate potential, and then supplies a second control signal pulse to turn on and off the sampling transistor when the signal line is at the signal potential, wherein said intermediate potential is different from said reference potential and said signal potential, and said intermediate potential is between said reference potential and said signal potential.

5. A method for driving a display device that includes a pixel array part and a drive part, the pixel array part including scan lines disposed along rows, signal lines disposed along columns, and pixels that are disposed at intersections of the scan lines and the signal lines and arranged in a matrix, the drive part driving the pixels via the scan lines and the signal lines, the pixel including at least a sampling transistor, a drive transistor, a hold capacitor, and a light-emitting element, a control terminal of the sampling transistor being connected to the scan line, a pair of current terminals of the sampling transistor being connected between the signal line and a control terminal of the drive transistor, a current terminal of the drive transistor being connected to the light-emitting element, the hold capacitor being connected between the control terminal of the drive transistor and the current terminal of the drive transistor, the drive part having a scanner that sequentially supplies a control signal to the scan lines and a driver that supplies a video signal to the signal lines, the sampling transistor being turned on in response to the control signal to sample the video signal and write the video signal to the hold capacitor, a current that flows through the drive transistor at the time of the writing of the video signal being subjected to negative feedback to the hold capacitor from the current terminal of the drive transistor to carry out correction for mobility of the drive transistor, a drive current being supplied from the drive transistor to the light-emitting element depending on a corrected video signal following the correction, the method comprising the steps of:

switching, by the driver, a potential of the signal line from a reference potential to an intermediate potential before switching the potential of the signal line to a signal potential of the video signal, for the writing of the video signal to the hold capacitor; and supplying a first control signal pulse from the scanner to turn on and off the sampling transistor when the signal line is at the intermediate potential, and then supplying a second control signal pulse from the scanner to turn on and off the sampling transistor when the signal line is at the signal potential, wherein said intermediate potential is different from said reference potential and said signal potential, and said intermediate potential is between said reference potential and said signal potential.

6. A display device comprising:

pixel arraying means for including scan lines disposed along rows, signal lines disposed along columns, and pixels that are disposed at intersections of the scan lines and the signal lines and arranged in a matrix; and driving means for driving the pixels via the scan lines and the signal lines, wherein the pixel includes at least a sampling transistor, a drive transistor, a hold capacitor, and a light-emitting element, a control terminal of the sampling transistor is connected to the scan line, and a pair of current terminals of the sampling transistor are connected between the signal line and a control terminal of the drive transistor, a current terminal of the drive transistor is connected to the light-emitting element, the hold capacitor is connected between the control terminal of the drive transistor and the current terminal of the drive transistor, driving means has a scanner that sequentially supplies a control signal to the scan lines and a driver that supplies a video signal to the signal lines, in the pixel, the sampling transistor is turned on in response to the control signal to sample the video signal and write the video signal to the hold capacitor, and a current that flows through the drive transistor at the time of the writing of the video signal is subjected to negative feedback to the hold capacitor from the current terminal of the drive transistor to carry out correction for mobility of the drive transistor, and a drive current is supplied from the drive transistor to the light-emitting element depending on a corrected video signal following the correction, the driver switches a potential of the signal line from a reference potential to an intermediate potential before switching the potential of the signal line to a signal potential of the video signal, for the writing of the video signal to the hold capacitor, and the scanner supplies a first control signal pulse to turn on and off the sampling transistor when the signal line is at the intermediate potential, and then supplies a second control signal pulse to turn on and off the sampling transistor when the signal line is at the signal potential, wherein said intermediate potential is different from said reference potential and said signal potential, and said intermediate potential is between said reference potential and said signal potential.

7. The electronic apparatus according to claim 4, wherein the scanner keeps a potential of the scan line at a predetermined potential during a period from falling-down of the first control signal pulse to rising-up of the second control signal pulse, if the signal potential is higher than a potential obtained by subtracting a threshold voltage of the sampling transistor from the predetermined potential, the sampling transistor is turned on in response to rising-up of the first control signal pulse and turned off in response to the falling-down of the first control signal pulse, and then the sampling transistor is turned on in response to the rising-up of the second control signal pulse and turned off in response to falling-down of the second control signal pulse, and if the signal potential is lower than the potential obtained by subtracting the threshold voltage of the sampling transistor from the predetermined potential, the sampling transistor is kept at an on-state during a period from the rising-up of the first control signal pulse to the falling-down of the second control signal pulse.

8. The electronic apparatus according to claim 4, wherein the sampling transistor is kept at an off-state during a period from falling-down of the first control signal pulse to rising-up of the second control signal pulse, and during the period, a potential of the control terminal of the drive transistor increases in such a way that potential difference between the control terminal of the drive transistor and the current terminal of the drive transistor is kept constant.

9. The method for driving the display device according to claim 5, wherein the supplying further comprises keeping, by the scanner, a potential of the scan line at a predetermined potential during a period from falling-down of the first control signal pulse to rising-up of the second control signal pulse, turning the sampling transistor on in response to rising-up of the first control signal pulse and turned off in response to the falling-down of the first control signal pulse if the signal potential is higher than a potential obtained by subtracting a threshold voltage of the sampling transistor from the predetermined potential, and then turning the sampling transistor on in response to the rising-up of the second control signal pulse and turning the sampling transistor off in response to falling-down of the second control signal pulse, and keeping the sampling transistor at an on-state during a period from the rising-up of the first control signal pulse to the falling-down of the second control signal pulse if the signal potential is lower than the potential obtained by subtracting the threshold voltage of the sampling transistor from the predetermined potential.

10. The method for driving a display device according to claim 5 further includes the steps of keeping the sampling transistor at an off-state during a period from falling-down of the first control signal pulse to rising-up of the second control signal pulse, and said keeping further comprising increasing a potential of the control terminal of the drive transistor in such a way that potential difference between the control terminal of the drive transistor and the current terminal of the drive transistor is kept constant.

* * * * *